(12) United States Patent
Sah et al.

(10) Patent No.: US 7,024,414 B2
(45) Date of Patent: Apr. 4, 2006

(54) STORAGE OF ROW-COLUMN DATA

(75) Inventors: Adam Sah, Berkeley, CA (US); Eric Karlson, Alameda, CA (US); Cimarron Taylor, Oakland, CA (US); Nathan Watson, San Mateo, CA (US)

(73) Assignee: Sensage, Inc., San Francisco, CA (US)

( * ) Notice: Subject to any disclaimer, the term of this patent is extended or adjusted under 35 U.S.C. 154(b) by 604 days.

(21) Appl. No.: 09/923,498

(22) Filed: Aug. 6, 2001

(65) Prior Publication Data

US 2003/0028509 A1 Feb. 6, 2003

(51) Int. Cl.
*G06F 17/30* (2006.01)

(52) U.S. Cl. .......................... 707/101; 707/1
(58) Field of Classification Search ..... 707/100–104.1, 707/1–5, 200
See application file for complete search history.

(56) References Cited

U.S. PATENT DOCUMENTS

| | | | | |
|---|---|---|---|---|
| 4,903,231 A | * | 2/1990 | Artieri | 711/1 |
| 4,953,073 A | * | 8/1990 | Moussouris et al. | 711/3 |
| 5,386,524 A | * | 1/1995 | Lary et al. | 711/206 |
| 5,490,100 A | * | 2/1996 | Kableshkov | 708/709 |
| 5,548,728 A | * | 8/1996 | Danknick | 709/213 |
| 5,640,559 A | * | 6/1997 | Silberbauer et al. | 707/101 |
| 5,706,461 A | * | 1/1998 | Branstad et al. | 711/203 |
| 5,765,201 A | * | 6/1998 | Manges et al. | 711/201 |
| 5,794,228 A | * | 8/1998 | French et al. | 707/2 |
| 5,794,229 A | * | 8/1998 | French et al. | 707/2 |
| 5,852,821 A | * | 12/1998 | Chen et al. | 707/2 |
| 5,918,225 A | * | 6/1999 | White et al. | 707/3 |
| 5,933,830 A | * | 8/1999 | Williams | 707/104.1 |
| 5,970,490 A | * | 10/1999 | Morgenstern | 707/104.1 |
| 5,999,944 A | * | 12/1999 | Lipkin | 707/104.1 |
| 6,057,704 A | * | 5/2000 | New et al. | 326/38 |
| 6,112,198 A | * | 8/2000 | Lohman et al. | 707/3 |
| 6,115,705 A | * | 9/2000 | Larson | 707/3 |
| 6,161,105 A | * | 12/2000 | Keighan et al. | 707/100 |
| 6,216,125 B1 | * | 4/2001 | Johnson | 707/4 |
| 6,223,182 B1 | * | 4/2001 | Agarwal et al. | 707/102 |
| 6,233,652 B1 | * | 5/2001 | Mathews et al. | 711/108 |

(Continued)

OTHER PUBLICATIONS

Wham Tech, Inc. Thunderbolt VLDB™ Features Description (A Technical Perspective), Oct. 2001, White Paper WHAM002Rev 2.2., pp. 1-14. www.whamtech.com/wham/documents/WhamTech *Thuderbolt VLDB Features Description.pdf.*

(Continued)

*Primary Examiner*—Jean M. Corrielus
*Assistant Examiner*—Anh Ly
(74) *Attorney, Agent, or Firm*—Blakely, Sokoloff, Taylor & Zafman, LLP

(57) ABSTRACT

Table data is stored by parsing the table data into columns of values, formatting each column into a data stream, and transferring each data stream to a storage device for storage as a continuous strip of data. The strip of data is stored as a file that is not structured as a series of pages. The formatting of the data stream may include compressing the column values to minimize the length of the data strip. A particular compression procedure may be used that derives a code for each value in the column from a number of occurrences of the value in the column and replaces the value in the data stream with the corresponding code.

43 Claims, 16 Drawing Sheets

U.S. PATENT DOCUMENTS

| | | | | |
|---|---|---|---|---|
| 6,430,553 | B1* | 8/2002 | Ferret | 707/3 |
| 6,622,144 | B1* | 9/2003 | Rush, Jr. | 707/102 |
| 6,625,627 | B1* | 9/2003 | Haneda | 707/205 |
| 6,691,099 | B1* | 2/2004 | Mozes | 707/2 |
| 6,708,164 | B1* | 3/2004 | Cseri et al. | 707/4 |
| 6,766,424 | B1* | 7/2004 | Wilson | 711/148 |
| 2003/0005257 | A1* | 1/2003 | Wilson et al. | 711/205 |
| 2004/0095608 | A1* | 5/2004 | Walmsley et al. | 358/2.1 |

OTHER PUBLICATIONS

Wham Tech, Real-Time VLDB Database and Search Technologies, "Spatial-Temporal Query Processing", Revision 1.3. Feb. 2000, pp. 1-6. www.whamtech.com/wham/documents/WhamTech *Spatial-Temporal Query Processing.pdf.*.

Goyal, et al., "Indexing and Compression in Data Warehouses", Indian Institute of Technology, Bombay, Proceedings of the International Workshop on Design and Management of Data Warehouses (DMDW'99) Heidelberg, Germany 14.-15.6 1999, pp. 11-1-11-17.

KXSystems, "Kdb, The Database for Both OLAP and OLTP Processing", White Paper, pp. 1-10, Jul. 2001. www.kx.com.

Whitney, et al., "High Volume Transaction Processing", pp. 1-19. www,kx.com/papers/hptsl.pdf., 1996.

Accrue Software Inc., Accrue Insight™ 5, 4pgs. www.accrue.com, 2000.

Colin J. White, "Sybase Adaptive Server IQ, A High-Performance Database for Decision Processing", Database Associates International, Inc., Jan. 1999, pp. 1-9. www.sybase.com/detail/1,6904,1008840,00.html Jan. 1, 1999 (High Perf. DB).

Frank Teklitz, "Sybase, The Simplification of Data Warehouse Design, Relational Data Cubes and Sybase® Adaptive Server® IQ Multiplex", White Paper, pp. 1-19. www.sybase.com/detail/16904,1008841,00.html. Aug. 22, 2000 (Relational Data Cubes).

Sand Technology™, "Sand Analytic Server™", 2 pgs., 2003. www.sand.com/downloads/fs_sand_analytic_server.pdf.

Sand Technology™, Nucleus®: Technological Core of the Sand Analytic Server™,2003. www.sand.com/downloads/wp_nucleus.pdf.

D.J. DeWitt, et al., "The Gamma Database Machine Project" IEEE Transactions on Knowledge and Data Engineering, pp. 44-62, Mar. 1990. www.citeseer.nj.nec/dewitt90gamma.jtml.

* cited by examiner

STORAGE OF ROW-COLUMN DATA

FIELD OF THE INVENTION

This invention relates generally to data storage, and more particularly to storage of data that is formatted in rows and columns.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, addamark technologies, Inc., All Rights Reserved.

BACKGROUND OF THE INVENTION

Traditional database management systems (DBMSs) are designed to handle a wide variety of data and are complex systems that are expensive to implement and maintain, both in terms of infrastructure and processing costs. Because of the time required to process new data for input into the underlying database, there is normally a delay of several hours before the data is ready for use. Additionally, traditional DBMSs are either optimized for large numbers of concurrent users performing on-line transaction processing (OLTP) that requires updating many portions of the database simultaneously, such as in relational databases, or on-line analytic processing (OLAP) that retrieves data from the data base using pre-calculated data summaries, such as in data warehousing, and are not efficient when handling small numbers of users doing custom analytical processing over very large volumes of non-indexed data. Furthermore, the current DBMSs were not originally designed as distributed systems and thus cannot efficiently leverage the processing resources of networked computers or storage devices, particularly over a wide-area network that includes encryption, proxy support, and caching, among its prerequisites.

SUMMARY OF THE INVENTION

A data management system stores table data by parsing the table data into columns of values, formatting each column into a data stream, and transferring each data stream to a storage device for storage as a continuous strip of data. The strip of data is stored as a file that is not structured as a series of pages. The formatting of the data stream may include compressing the column values to minimize the length of the data strip. A particular compression procedure may be used that derives a code for each value in the column from a number of occurrences of the value in the column and replaces the value in the data stream with the corresponding code. Because the underlying file structure is a simple strip of data, the data management system of the present invention requires less overhead to store and process the data than traditional database management systems. Furthermore, the storage techniques of the data management system of the present invention are particularly suited for use with table data that has one column containing strictly increasing linear values, such as chronological data, because such data exhibits greater compression on a columnar basis than on a row basis, thus saving additional storage space.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

The detailed description is divided into four sections and a conclusion. In the first section, a system overview of the invention is presented. In the second section, particular embodiments of the invention are detailed. In the third section, methods for an embodiment of the invention are described with reference to flowcharts. In the fourth section, an operating environment in conjunction with which embodiments of the invention may be practiced is presented.

System Level Overview

Figure 1A:
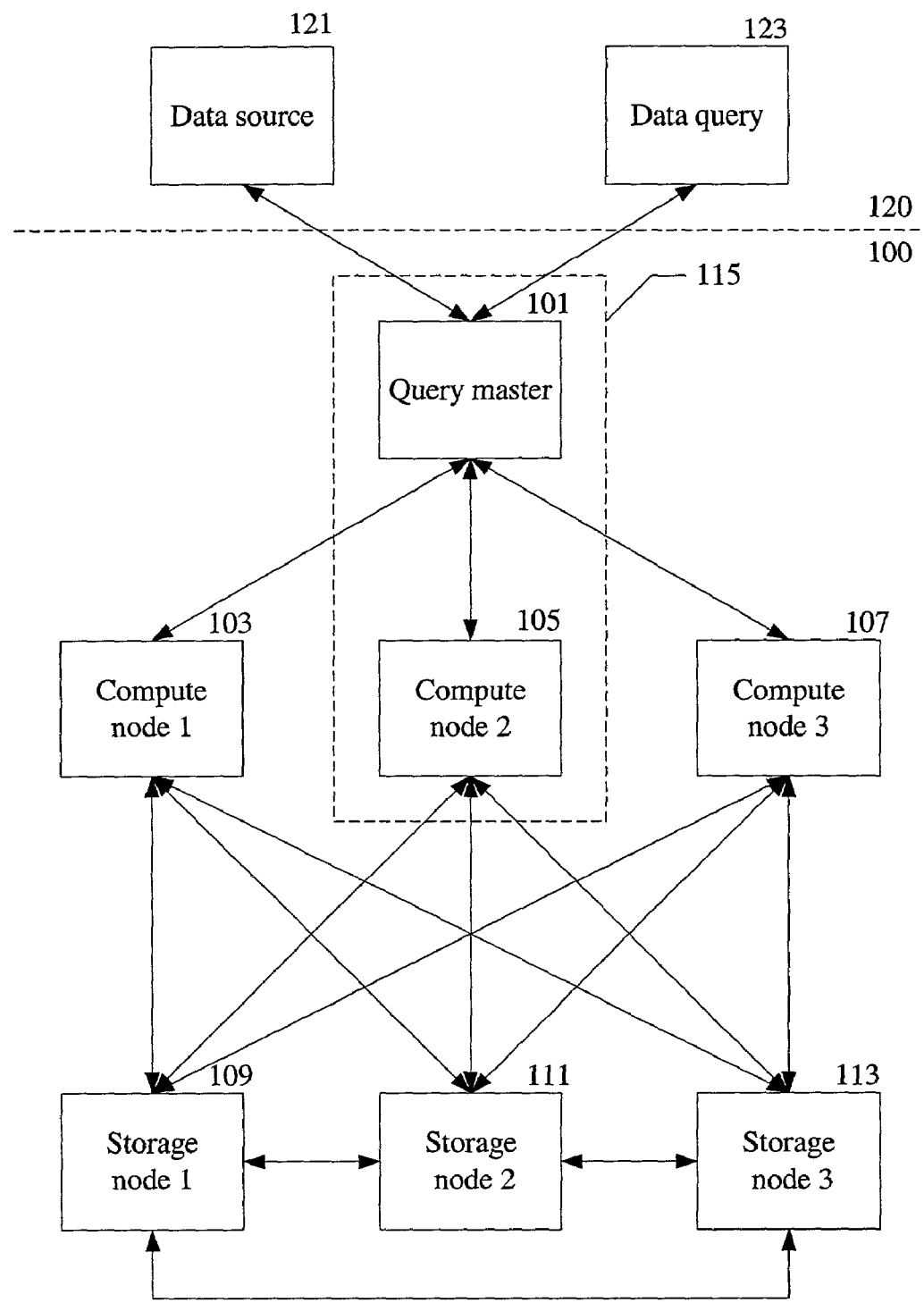
FIG. 1A is a diagram illustrating a system-level overview of an embodiment of the present invention.
Figure 1B:
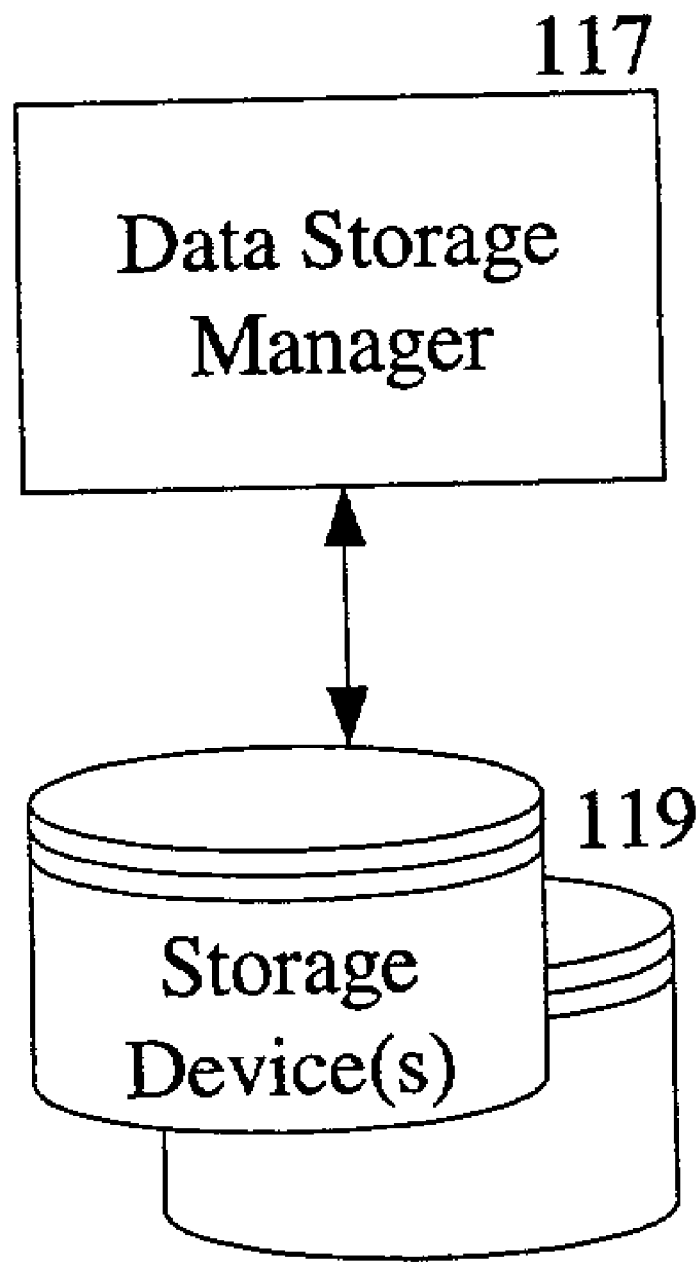
FIG. 1B is a diagram illustrating a storage node for the embodiment of the invention shown in FIG. 1A.

A system level overview of the operation of one embodiment of a data management system according to the present invention is described by reference to FIGS. 1A and 1B. In general, the data management system 100 of FIG. 1A includes a network of computer processors acting as logical compute nodes 103, 105, 107 and storage nodes 109, 111, 113. The processing described herein for the compute nodes and storage nodes may execute on separate computer processors or execute in various combinations on multiple computer processors, and the invention is not limited to any particular arrangement of these components. A data source 121 and a data query 123 are described below as originating in a client system 120 but are also contemplated as originating from another computer processor within the network of compute and storage nodes. Additionally, as shown in FIG. 1A, a computer processor 115 that hosts compute node 105 also hosts a logical query master 101 that interfaces with the client system 120 to load data and process queries, but the invention is not so limited.

The query master 101 determines how to divide the processing load among the compute nodes 103, 105, 107. When the query master 101 receives table data, i.e., data formatted in rows and columns, from the data source 121, it divides the data among compute nodes 103, 105, 107, which in turn parse the data to storage nodes 109, 111, 113 for storage. As shown in FIG. 1B, each storage node includes a data storage manager 117 and one or more mass storage devices 119, generically illustrated as hard disks. The mass storage devices 119 may be locally attached to the data storage manager 117, attached remotely, such as network attached storage (NAS) devices or storage area network (SAN) devices, or a combination of locally and remotely attached devices.

The data storage manager 117 employs custom storage techniques designed to compensate for the slowness of mass storage devices when the data is retrieved in response to the data query 123. In particular, the present invention stores row-column (table) data in column-form, i.e., files of columns, in contrast to traditional database management systems (DBMS) that store row-column data in row-form, i.e. files of rows. This column-orientation is referred to herein as "vertical partitioning" because the data is divided up vertically. Unlike traditional DBMSs, which process one row at a time, the present invention processes one column, i.e., a long vertical strip of data, at a time. Thus, each data storage manager 117 stores the column values on the mass storage devices 119 in strips, as opposed to pages as in traditional database systems.

When the query master 101 receives a data query 123, it develops a query plan that splits intermediate tasks of the query into sub-queries that are distributed among the compute nodes 103, 105, 107 for processing. Upon receiving a sub-query from the query master 101, each compute node 103, 105, 107 requests the data associated with one or more tables, i.e., a given set of column(s) over a given range, from each storage node 109, 111, 113 by sending the predicates specified in the condition clauses, e.g., WHERE, SELECT target functions, etc., in the sub-query to each data storage manager 117 in parallel. Each data storage manager 117 reads data from the appropriate column-files into in-memory structures in the storage node, where it is filtered according to the predicates. In one embodiment, each data storage manager 117 evaluates the values in a column against the predicates to produce a column of Boolean values that specify which values in the column qualify, i.e., true=qualifies. The results of the filtering are returned to each compute node 103, 105, 107 as columns of data. Any aggregation functions e.g., SUM, MAX, etc., and sorting clauses, e.g., GROUP BY, ORDER BY, etc., in the sub-queries are applied to the returned columns by each compute node.

The aggregated data is sent "up" to the query master 101 by each compute node 103, 105, 107, where it is merged into a single data stream that is returned to the client 120 that sent the original query 123. The query master 101 may also perform final operations on the aggregated data, including a final sorting of the data. It will be appreciated that the compute nodes may further sub-divide its assigned sub-query plan into finer sub-queries and perform multiple levels of aggregation on the data returned as a result of the finer sub-queries from the storage nodes.

In order to optimize I/O and memory (RAM) access performance, one embodiment of the data storage manager 117 compresses the data before it is stored, and each column-file contains a header specifying the compression algorithm and other meta-data for the file. Compressing the data column values can lead to 2:1 better compression over compressing the same data when it is arranged in rows. As a further optimization, prior to compression, the data storage manager 117 formats the data for subsequent storage on the storage device 119 in substantially the same way it would optimally be used in memory. Where traditional DBMSs call "get next" without concern for RAM or disk alignment, the in-memory data structures are sized to be a factor of the cache size of the computer system and the data storage manager 117 retrieves the data in blocks that are sized to fit within the in-memory data structures so that when the current block of data in the in-memory data structures is processed, another block is waiting in the cache. If the processor is fast enough, all the data in a column-file can be processed on a single scan of the storage device. These optimization techniques save at least one memory-copy operation, as well as minimizing the "memory profile" required by the system 100, which improves performance by improving the RAM cache hit rate. Furthermore, because sequential I/O operations are used to read the column values into the in-memory data structures during query processing, the invention provides superior performance than a traditional row-oriented database processor on modern hardware when performing calculations across many values in a column. Additionally, the cost to setup such computations is amortized across all the values and the data involved in the computation is much more likely to be in the cache.

As described further below, the storage techniques of the present invention are particularly suited for use with row-column data in which one column contains strictly increasing linear values, such as chronological data. The system 100 uses the column of linear values as the primary key for the data. Thus, new data can be appended to the end of existing data and updates of existing data are rare.

In one embodiment, the primary key column is horizontally partitioned into separate column-files. The remaining columns are similarly horizontally partitioned into column-files, such that each of these column files aligns with the corresponding primary key column-file and each of the column-files has a equal number of entries. The result of the horizontal partitioning is a series of sets of column-files, in which the corresponding entries in the column-files for a set represent a table row. The sets are distributed across the storage nodes, with all the column-files for a set typically being stored on the same storage node. In one embodiment, the horizontal partitioning is based on key value ranges such that the set of column-files for a particular range of primary key values are stored on one node. In an alternate embodiment, the primary key is hashed to produce the sets of column-files, which creates overlapping ranges of key values on the nodes. In still another embodiment, the sets are determined by applying expressions across the data ("predicate partitioning"). The distribution of the sets across the storage nodes speeds up the parallel retrieval of the data when the condition clauses specify ranges that span storage nodes. In particular, predicate partitioning improves reliability when one node (or group of nodes) is unavailable, and improves performance when one node (or group of nodes) is coupled to into the system 100 through a slow connection.

Additionally, the system 100 requires that all queries 123 include a value range for a linearly-increasing primary key on the assumption that most uses of the data will be based on a specific and limited range of primary key values. When the table data is horizontally partitioned into sets of column-files, the primary key values can be used as an index to search for and open only those column-files needed to fulfill the predicates of the query 123, thus increasing the speed of query processing.

These restrictions allow the query master 101 to dispense with checks to determine the primary key and replace typical query optimizer code, which would normally select the index method, with algorithms that can accurately estimate the selectivity of the primary key range, with the option to deploy other query strategies only as needed. These restrictions also underlie the custom data storage techniques of the present invention that are embodied in the storage nodes. However, the storage techniques of the present invention are not limited to use with linearly-increasing data. For example, when storing data with a primary key that is not strictly linearly increasing, such as a user identifier, the data can be sorted on the primary key before storing and the storage broken down by ranges, as described above.

In the embodiment of the system 100 illustrated in FIG. 1A, the storage nodes 109, 111, 113 are further coupled together in a peer-to-peer "ring" architecture. Each storage node is aware of its two neighbors, and each piece of data is replicated on an "adjacent" storage node, e.g., storage node 111 may replicate its data on an adjacent storage node 109 or 113. The replication of data across the storage nodes provides "failover" capabilities to the system 100 as described below in conjunction with FIG. 4B further below. Additionally, the ring architecture allows a storage node that is running low on local storage space to select arbitrary portions of files to send onto one of its neighbors. If the neighbor node indicates that it cannot handle all the data, the overloaded node can check with its other neighbor.

The inclusion of standby storage nodes in the ring architecture allows the ring to "heal" itself in case of failure of a storage node by replicating the data from a failed node onto one of the standbys. Furthermore, a standby storage node may be activated to partially offload a node that is running low on local storage space.

Partial "mirrors" of data also can be created across the storage nodes. For example, the last 24 hours of data may be stored on one storage node to partially mirror the last 90 days of data that is stored on a different storage node. Queries requiring only the last 24 hours may run in either location, or both, depending on, for example, manual selection by the compute node on which the query was submitted (or the user), or automatic selection by a load balancing system. In addition, the partial mirrors can be combined on-the-fly to create answers to queries when the original data set cannot be accessed or not accessed efficiently.

The connections between the compute and storage nodes can be local-area network (LAN) connections, such a provided within a private facility, wide-area network (WAN) connections, such as the Internet, or any combination of the two types of connections. The data may be replicated across the connections using standard network protocols. Because inter-node communication can be a more scarce commodity than processing power on either end, in one embodiment, a sending node performs column-wise compression on the data prior to transferring the data to the receiving node.

The system 100 may achieve faster total data throughput when the data is stored on mass storage devices local to the storage nodes than if the data were stored on remote devices. For example, if a node can attain a disk-to-memory transfer rate of 100 MB/sec, 10 nodes can achieve 1000 MB/sec, since each node is a computer equipped with a standard bus capable of supporting these throughputs. In contrast, the throughput when storing the data on remote devices is limited by the speed of the switch that connects the nodes to the remote devices. Additionally, when network bandwidth is more expensive to deploy than local storage, then a distributed, local-storage-based system is more cost effective.

The system level overview of the operation of one embodiment of a data management system according to the present invention has been described in this section of the detailed description. The data management system vertically partitions table data into its columns and stores the columns on disk as compressed strips of data, forming column-files. When the data in the column-files for the table are horizontally partitioned into sets of column-files, the sets may be stored on different storage nodes to speed query processing when running parallel queries. The column-files also may be fully or partially mirrored on multiple storage nodes to provide redundancy. The system further leverages the vertical partitioning of the data through the query processing system because data which is not required for a given query is never read from data storage, and data which is only needed in part of the query can be immediately discarded, e.g., used in processing the WHERE clause but not the GROUP BY and aggregate functions. If the compute nodes are designed to detect duplicates, mirrored data can also be queried, resulting in still faster performance. Thus, in contrast to traditional DBMSs that internally process data one row at a time when retrieving data, columns instead of rows flow past the nodes of the present data management system for processing.

EMBODIMENTS OF THE INVENTION

Figure 2A:
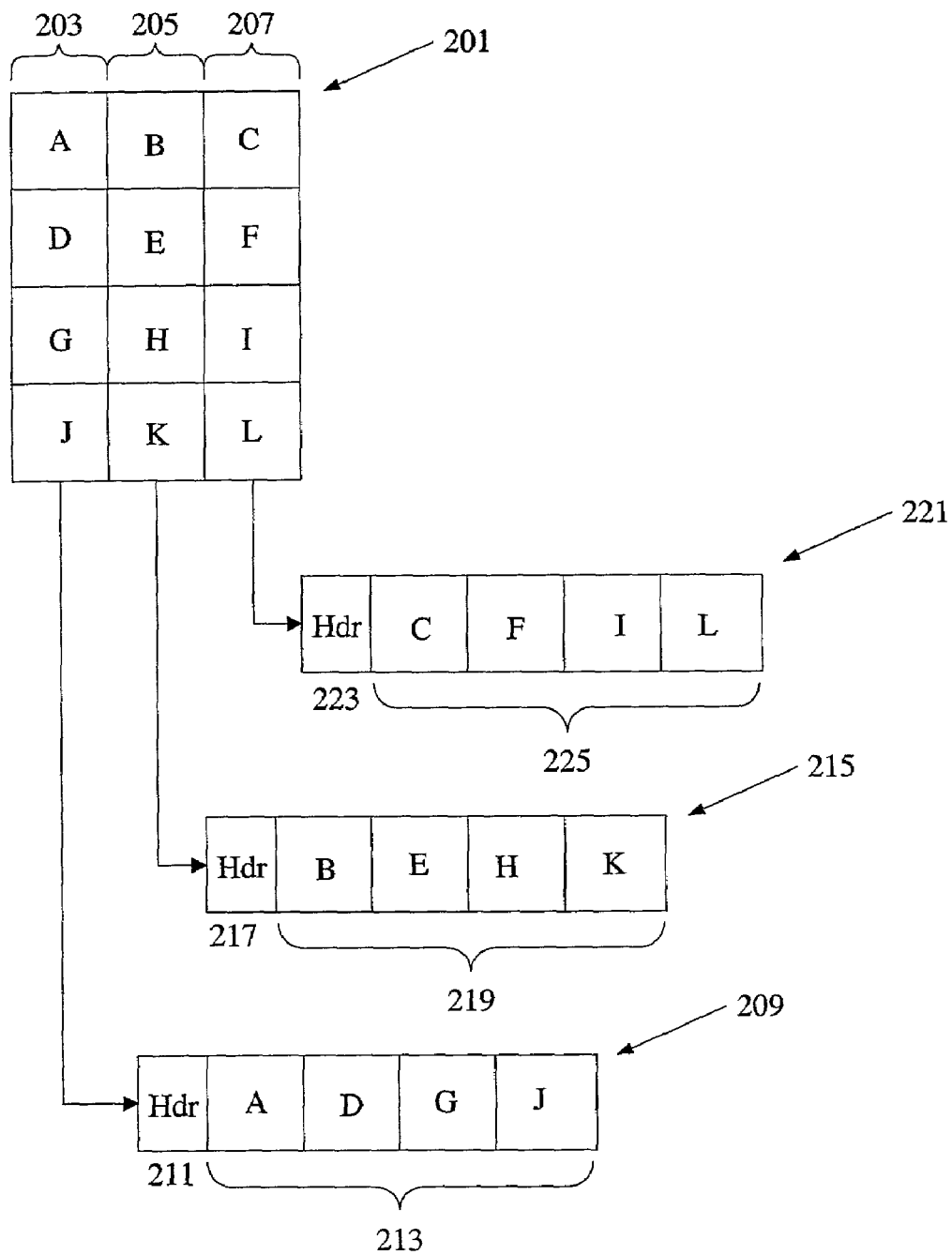
FIGS. 2A–C are diagrams illustrating data storage structures according to embodiments of the invention.
Figure 2B:
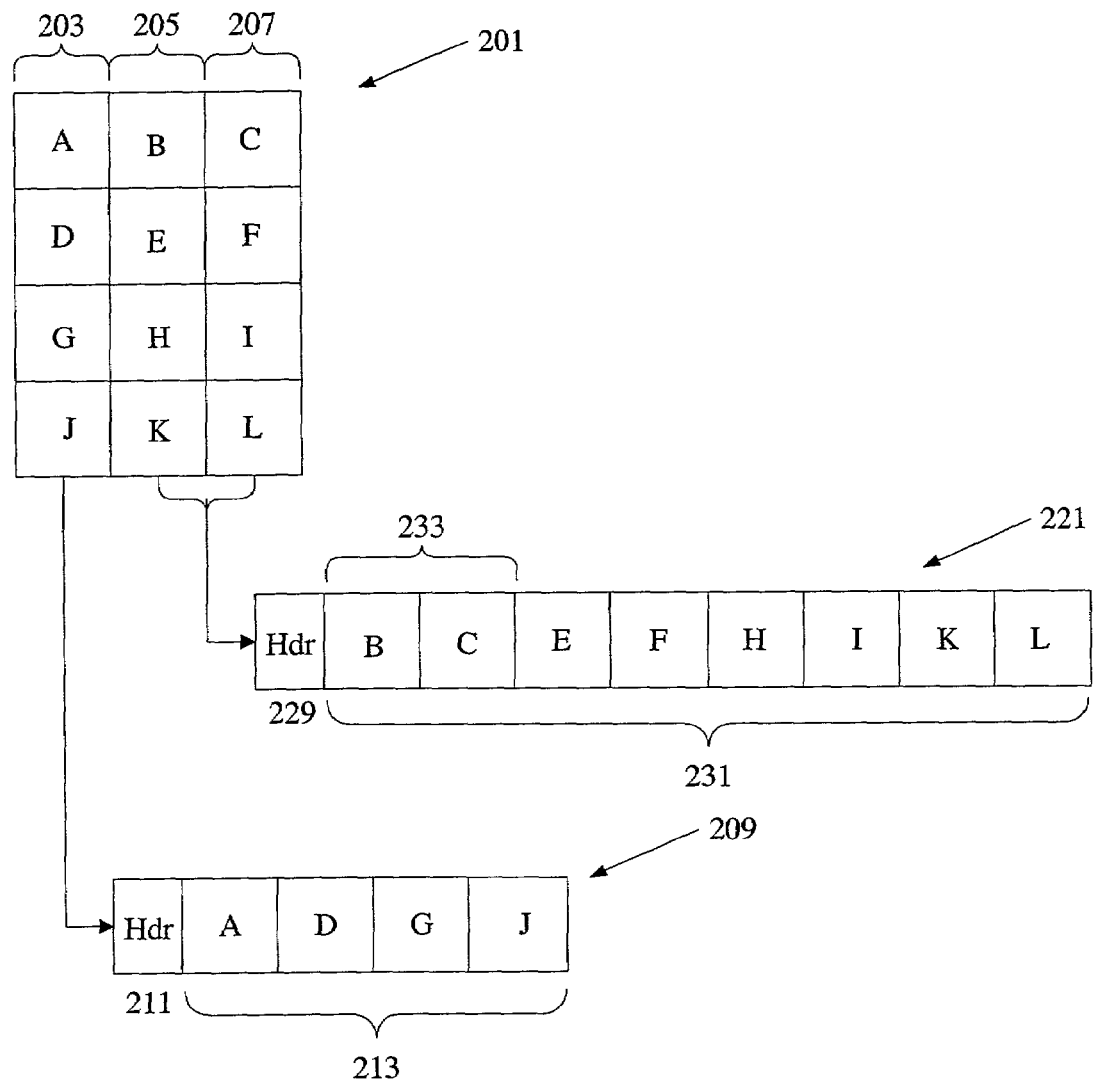
Figure 2C:
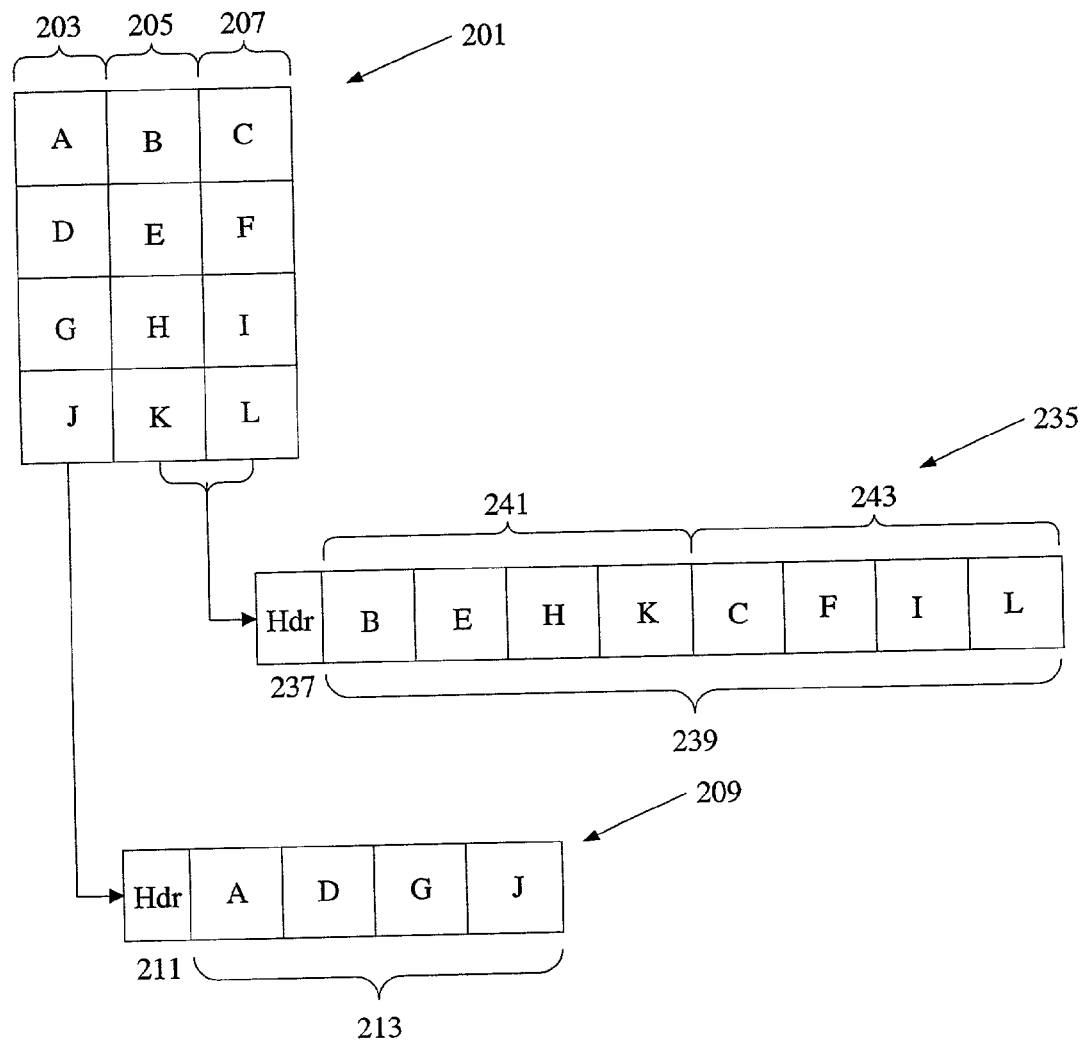

Turning now to FIGS. 2A–C, three embodiments of storage data structures in accordance with the present invention are described.

In the embodiment shown in FIG. 2A, row-column data 201 is partitioned by columns 203, 205, 207 and each column is stored in a single column-file 209, 215, 221, respectively. Each column-file 209, 215, 221 contains a header 211, 217, 223, and a data strip 213, 219, 225 containing the values of the corresponding column. The column values are maintained within the column-file in primary key order. As previously described, the data is compressed before being stored using well-known general purpose compression algorithms, such as the public-domain "deflate" algorithm, in combination with compression algorithms suited for transposing rows and columns, e.g., Xmill from AT&T Labs Research. A special compression procedure that may be used by the present invention is described further below. It will be appreciated that each column 203, 205, 207 may be horizontally partitioned into multiple column-files, as described above, with each of the column-files having a column containing a header and a data strip as illustrated in FIG. 2A.

It may be desirable to store multiple columns together in a column-file, such as when they are small and frequently accessed at the same time. Under these circumstances, the data can be stored as shown in FIGS. 2B and 2C. FIG. 2B illustrates a mode ("mode 1") in which two columns 205, 207 are stored as pairs of values 233 to form a data strip 231. Mode 1 allows fast retrieval of related data. FIG. 2C illustrates a mode ("mode 2") in which two columns 205, 207 are sequentially stored as columns 241, 243 to form a data strip 239. Mode 2 results in better compression of the data than mode 1 because only one instance of repeating values in the stored columns 241, 243 need be stored. In either mode, the header 229, 237 specifies the format of the data strip. Although not illustrated, a single column-file could mix the modes by separating the mode-specific data strips by pre-defined codes.

Traditional DBMSs provide indices into the data tables for faster retrieval of the individual records. Typically, an DBMS index is a two-column table: one column contains key values and the other contains references (pointers) to the records, e.g., "record ID," in the table being indexed. Indexes allow the DBMS to locate matching records on a predicate, e.g., "employee.salary>50000," more quickly than scanning the entire table into memory and comparing each item. In contrast, the present invention need only read in the column-file for the "employee.salary" column to resolve the predicate. Because current storage devices often require less time to scan data than to seek data, it is often more effective to scan a column of data into memory for comparison than to retrieve individual data values using pointers.

In one embodiment, the column-files are indexed with partial indices containing entries for those values that occur relatively infrequently in the data. Moreover, when the data in a column is divided over column-files that each hold a small range of values, no pointer is stored in the partial index since scanning the appropriate column-file(s) into memory is faster than retrieving the individual values. Thus, an index may be nothing more than a list of which uncommon values are found in a given column-file and the savings in storage space may be considerable.

As briefly described above, the column-files may be compressed using a special procedure. In general, each column is scanned for unique values, a dictionary file is created from the unique values, each unique value is assigned a code that is chosen to maximize the compression of the data, and the codes are stored in place of the data values in the column-file ("data file") as illustrated in FIGS. 3A–D, resulting in compression of the data file over the original column data when the code is chosen to be smaller than the original data. Using a variable-length integer for the code further compresses the data file and allows for an unlimited number of unique values per data file. Optionally storing the dictionary file into the header of the data file, or otherwise concatenating the files together, provides file system management benefits, such as ease in transporting and backing up the data file and dictionary files.

In the embodiments shown in FIGS. 3A–D, the dictionary file also contains an optional count of the number of occurrences of each unique value in the column. By storing a count of the number of occurrences of each value in the dictionary file, the popular SUM, COUNT, AVERAGE, MIN and MAX aggregate functions can be computed much more quickly, since the data file does not need to be scanned, and at minimal space overhead, especially if a space-efficient representation for the counters is used, e.g., a variable-length integer. Furthermore, the count of occurrences allows the system to execute an equivalence query without having to scan all entries within a data file. For example, assume the query is "select x where y=z" and the dictionary file for the data file for column y indicates that only two occurrences exist. Therefore, once the two occurrences have been found, the scan can be terminated.

The dictionary file may be used as an index into the data file instead of a partial index as described above. Using the dictionary file in place of a partial index enables faster response to negative queries containing uncommon values. For example, assume the query is "select x where y is not equal to z" with z being a uncommon value. The dictionary files for the majority of data files for column y will not contain the value z and thus the majority of the data files for the column y and the associated column x can be eliminated from consideration without having to open the data files themselves.

The dictionary file also provides for optimizations in updating data files by updating only the corresponding dictionary files. In one embodiment, the update is allowed if the new value is not already in the dictionary. In an alternate embodiment, if the value already exists, another copy of the value is made in the dictionary. The additional copy will result in faster updates, but may do so at the cost of slightly slower reads depending on the technique used to encode the dictionary file. In particular, when using Huffman encoding as described below in conjunction with FIGS. 3C–D, multiple different Huffman codes will refer to the same value, thus slightly increasing the time required to locate all the duplicated values. Additionally, the additional copy requires that the storage node be able to detect the duplicate dictionary entries, especially when predicates are evaluated against the dictionary file.

Figure 3A:
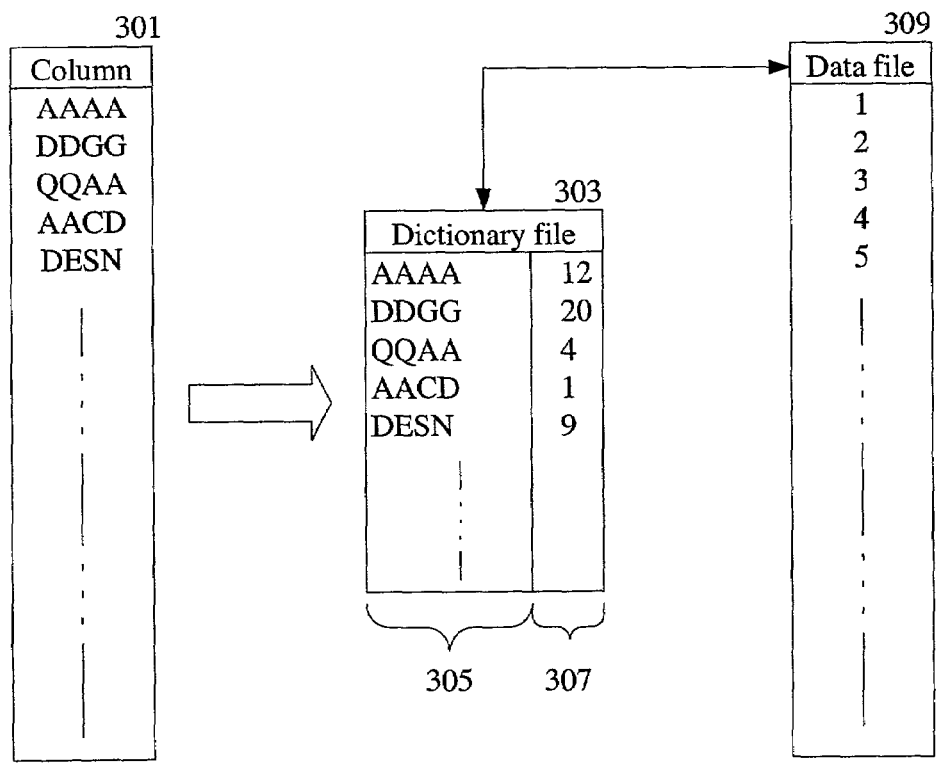
FIGS. 3A–D are diagrams illustrating data compression according to embodiments of the invention.

In the embodiment shown in FIG. 3A, dictionary file 303 is created from the data values 305 in column 301 and includes the corresponding occurrence counts 307. The code assigned to each unique value is an offset to the entry in the dictionary file 303 that contains the value. Thus, data file 309 contains codes 1, 2, 3, 4 and 5 that correspond to values AAA, DDGG, QQAA, AACD and DESN, respectively.

Figure 3B:
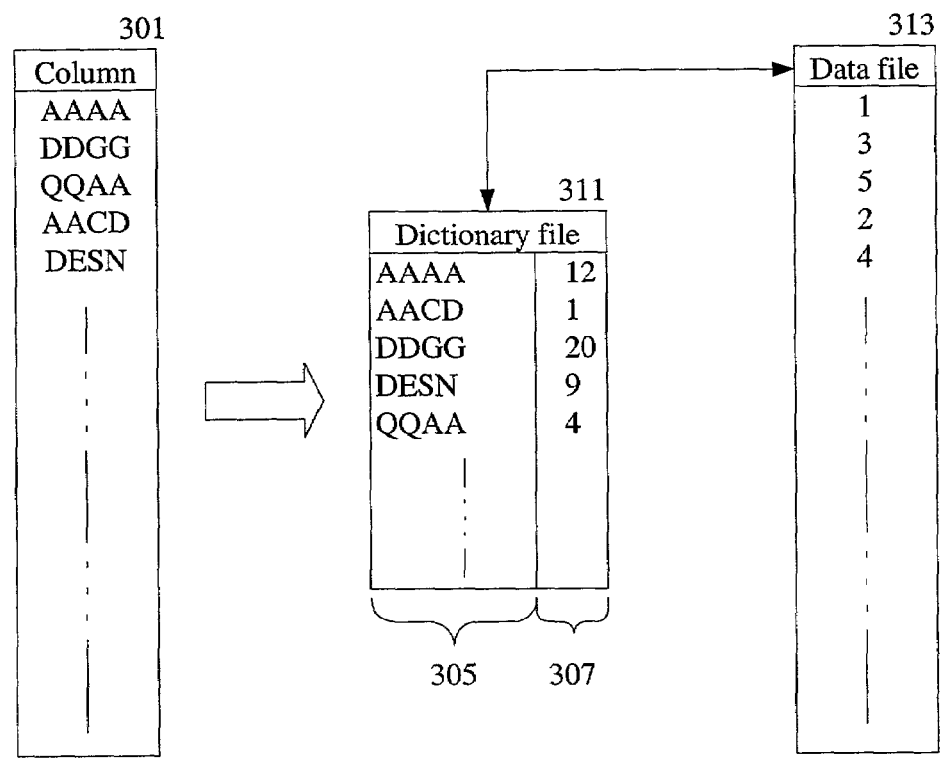

When there are a large number of unique values in the column, the dictionary file may be as large as the data file. As illustrated in FIG. 3B, under these circumstances, the dictionary file 303 is sorted by value to allow compression of the values in the resulting dictionary file 311, and the codes in the data file 309 are updated to correspond to the new offsets, producing data file 313.

Figure 3C:
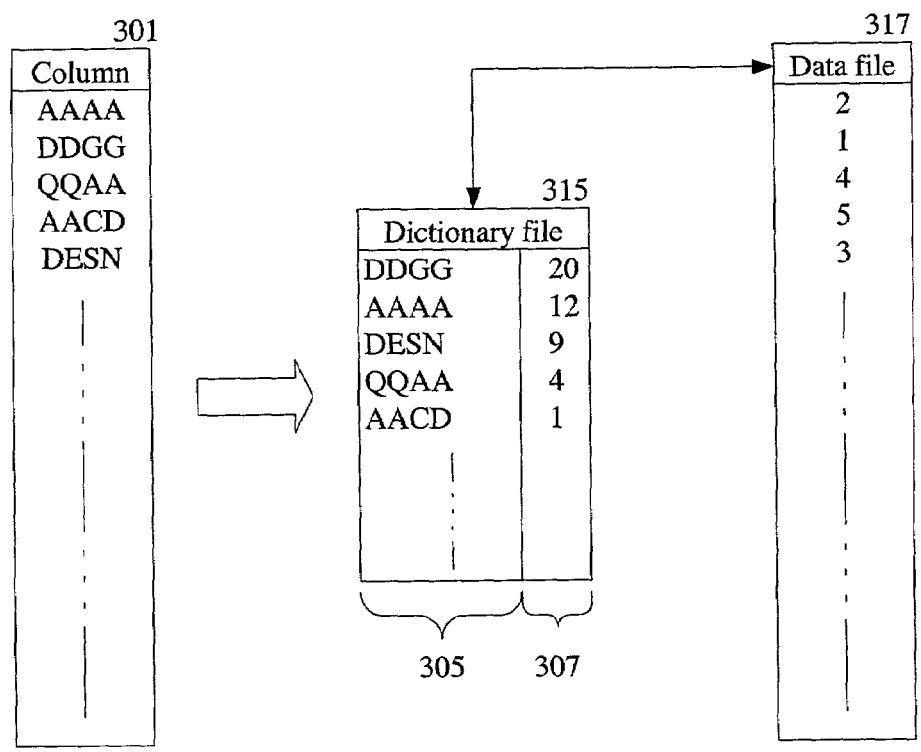

On the other hand, when the data file is much larger than the dictionary file, i.e., there are few unique values in the column, the dictionary file may be sorted in descending order on the occurrence count so that the offset for the more common values can be represented by smaller variable-length integer codes as shown in dictionary file 315 in FIG. 3C. This provides further compression of the corresponding data file 317.

It will be apparent that the decision of whether to sort the dictionary file on values or on counts is based only on the relative sizes of the data file and dictionary file and is independent of the type of data in the column. Thus, special user-defined data types, such as "telephone number" can be handled without special coding. Furthermore, the sorting choice does not change the data structures of the dictionary file or data file, so two different versions of the storage and retrieval processes are not necessary.

Figure 3D:
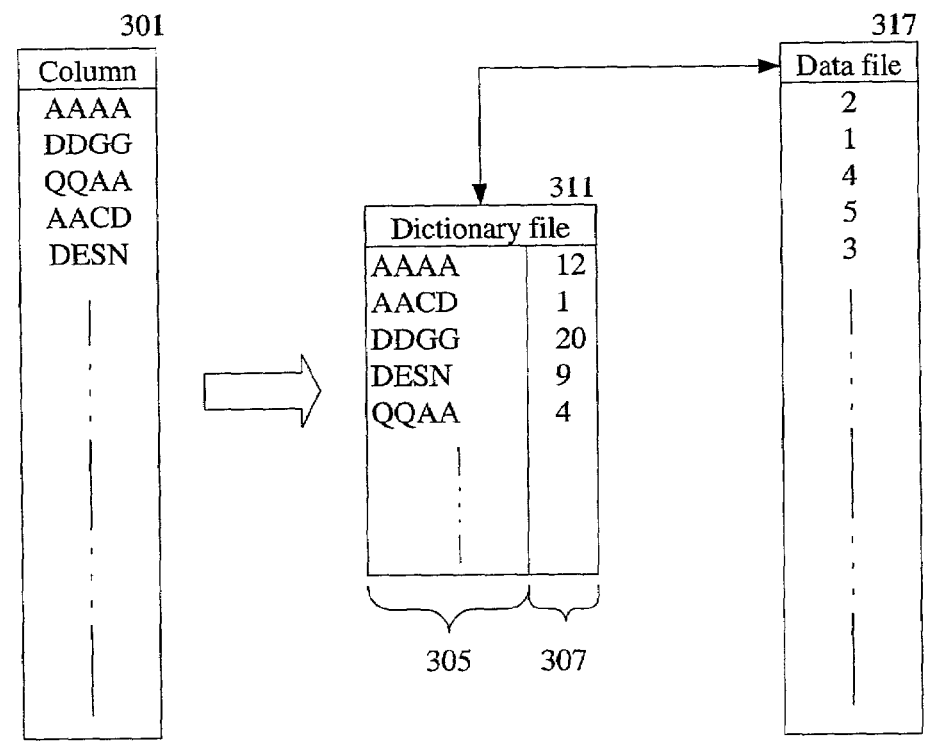

In a further embodiment, Huffman encoding is used to generate the codes for the values. As is well-known, Huffman encoding produces an optimal set of variable-length integers for encoding a given data set that is derived from the occurrences of the values within the set. Huffman encoding will always produce code X for a value having Y occurrences so the data in the dictionary file can be sorted on either value or occurrences without changing the code assigned to a value. Returning to FIG. 3C, assume the codes in the data file 317 are Huffman codes. If the dictionary file 315 is then sorted on value rather than occurrence count, as shown in FIG. 3D, the data file 317 does not change because the occurrence counts for the values have not changed although the order (offset) of the entries in the dictionary file has changed. When the data file 317 needs to be decompressed, the Huffman encoding is run against the occurrence counts in the dictionary file 311, 315 to regenerate the Huffman code for each value. Thus, a table of the actual Huffman codes used in the data file does not have to be stored with the data file or dictionary file.

In the case where multiple values have the same occurrence count, Huffman encoding will create a unique code for each values based on the relative order in which the values are input into the algorithm. One way to ensure the correct regeneration of the codes in this instance is to order the side file on value so that the values are input in the same order each time.

It will be further appreciated that sorting the dictionary file in descending order on the count as in FIG. 3C causes the Huffman codes in the data file to act as an implied reverse index into the dictionary file since there is a direct relationship between the location of the value in the dictionary file and the code generated by Huffman for the value.

The data files may be compressed still further by applying run-length-encoding (RLE) to the codes in the files. An RIE encoding table contains an entry for each repeated value having a minimum threshold of $N_{min}$ occurrences. Since the encoding table entries take up some space, $N_{min}$ should be chosen to balance the RLE encoding space overhead with its benefits. In one embodiment, $N_{min}$ is set to 20–40 to account for processor overheads. Each entry consists of the number of times the value is repeated and the row-offset (record number) of the column value in the data file. Only the first occurrence of each value remains in the data file. For example, assume the following data file:

1234 1234 1234 1234 1234 5678 5678 1234 1234.

The corresponding RLE encoding table would contain the following entries:

1, 4; 6, 2; 8, 2 and the resulting RLE data file would be:

1234 5678 1234.

Thus, when scanning the RLE data file, the scanner would stop (and iterate N times) when it reaches a value whose record number is equal to the row-offset of the next RLE table entry, reducing the amount of scanning necessary by a storage node. Furthermore, RLE reduces memory consumption for the data file when scanned into memory (particularly advantageous when the data is repeatedly scanned in), and also increases the speed of iterations through the data file in memory, since reducing the amount of memory required reduces the number of cache and table look-aside buffer misses that must be handled.

While the system 100 provides for user-defined functions (UDF) and aggregations (UDA) to extend the set of functions and aggregations provided by a query language, the use of the highly effective compression algorithms in conjunction with the column-oriented storage of the present invention enables the creation of additional data columns as an alternate to the use of UDFs and UDAs. When the additional data compresses down to a sufficiently small amount of space, the cost of storing such data is small and has little impact on retrieval of the original data since the additional data is stored in a separate column-file that is only accessed when needed.

In one embodiment, when chronological data is stored in the system by appending multiple rows in a single batch, an extra column is used to record a batch "upload" identifier and provide the ability to recover from an erroneous batch store without affecting other data uploaded in different batches. For example, suppose there are less than 65536 uploads in a time range, then the variable-length integer encoding described above will require no more than 6 bits per a 250 byte record to encode the batch identifier. This will compress to approximately less than 1 bit per record, a trivial amount compared to the 10–15 bytes per record post-compression. It will be appreciated that number of uploads and record size vary with the type of data.

In an alternate embodiment, a "last-modified time" column is added to each row of data. Since such rows are typically modified in batches, there will be multiple occurrences of the same last-modified times, leading to efficient compression of the information. Similarly "last access time" can also be tracked as a per-column-file value.

Still another embodiment would add a "node name" column in each row to allow queries to report which node is the data store for the given row. This information is useful for performance tuning, data layout design and other system operations tasks. The "node name" column can also be extended to work for aggregation functions, such that the node which computed the aggregate value (e.g. MEDIAN( ), SUM( ), COUNT( ), etc.) is returned, rather than the node name(s) where the input rows came from, which is also useful for performance and other tuning tasks. In another embodiment, the name of each node that processed the data, beginning with the query master node that initiated the data load, is also stored. Alternatively, only the critical nodes, such as the query master, the highest level compute node, and the storage nodes are present in the node name column.

Figure 4A:
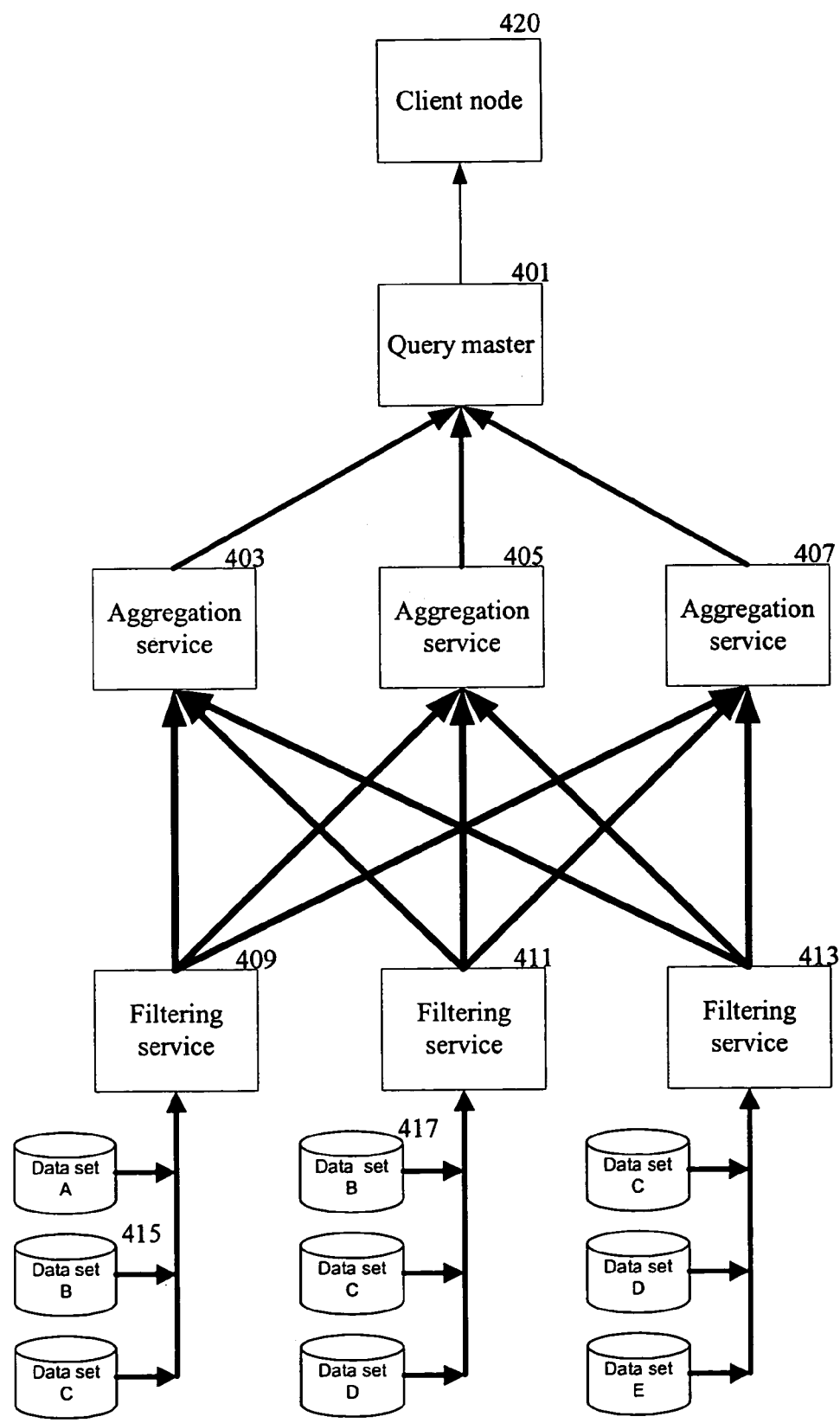
FIGS. 4A–D are diagrams illustrating data storage and retrieval according to embodiments of the invention.
Figure 4B:
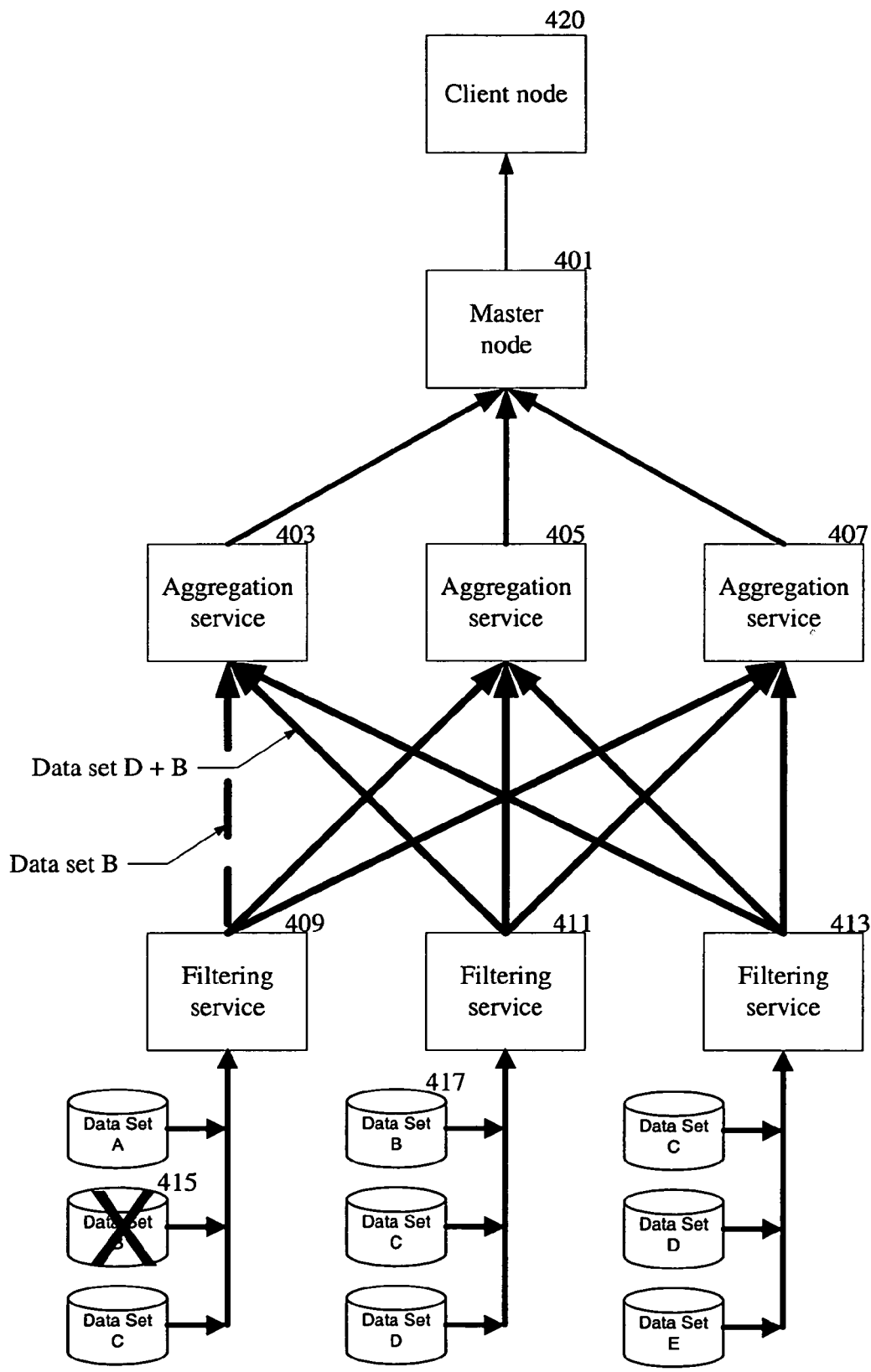
Figure 4C:
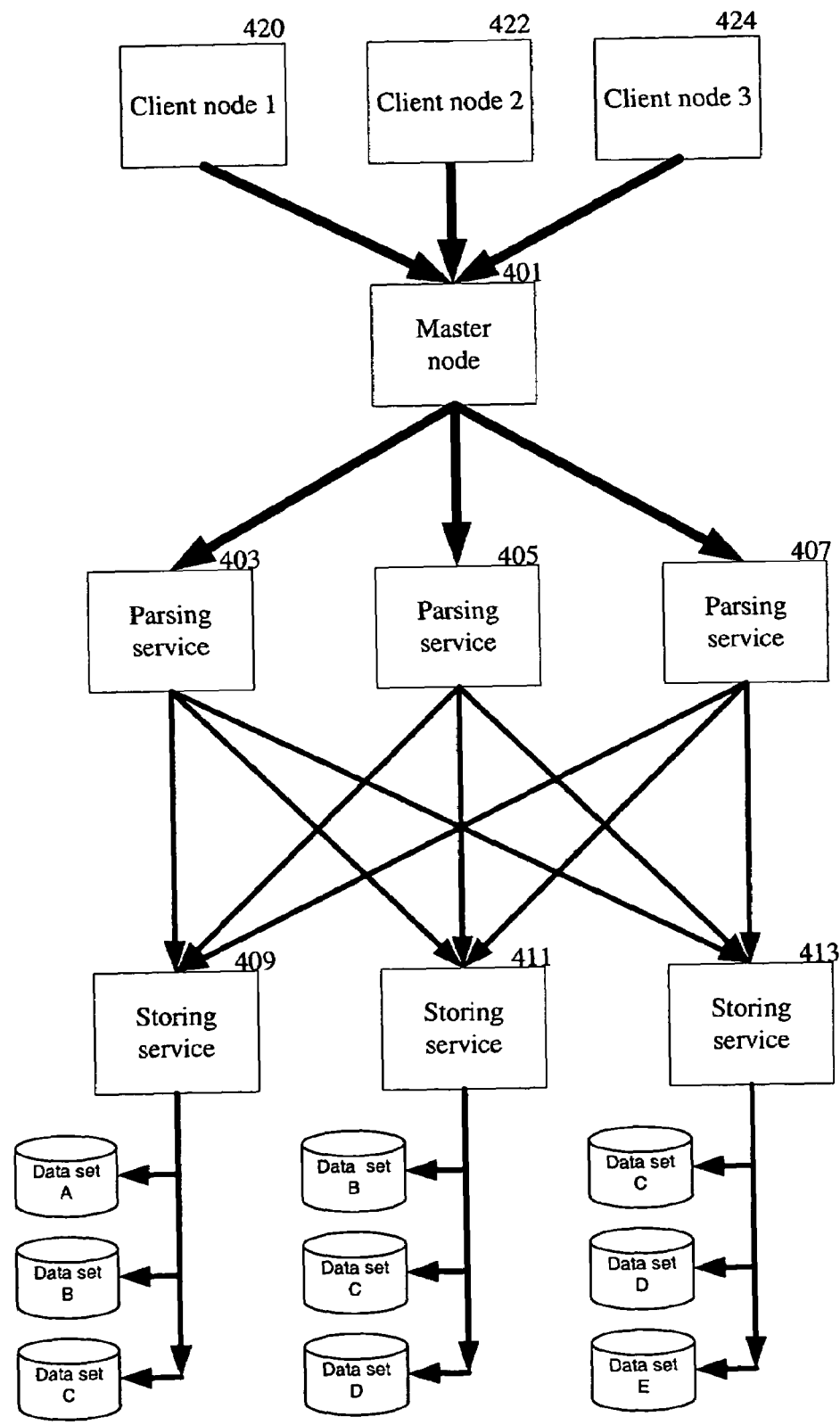
Figure 4D:
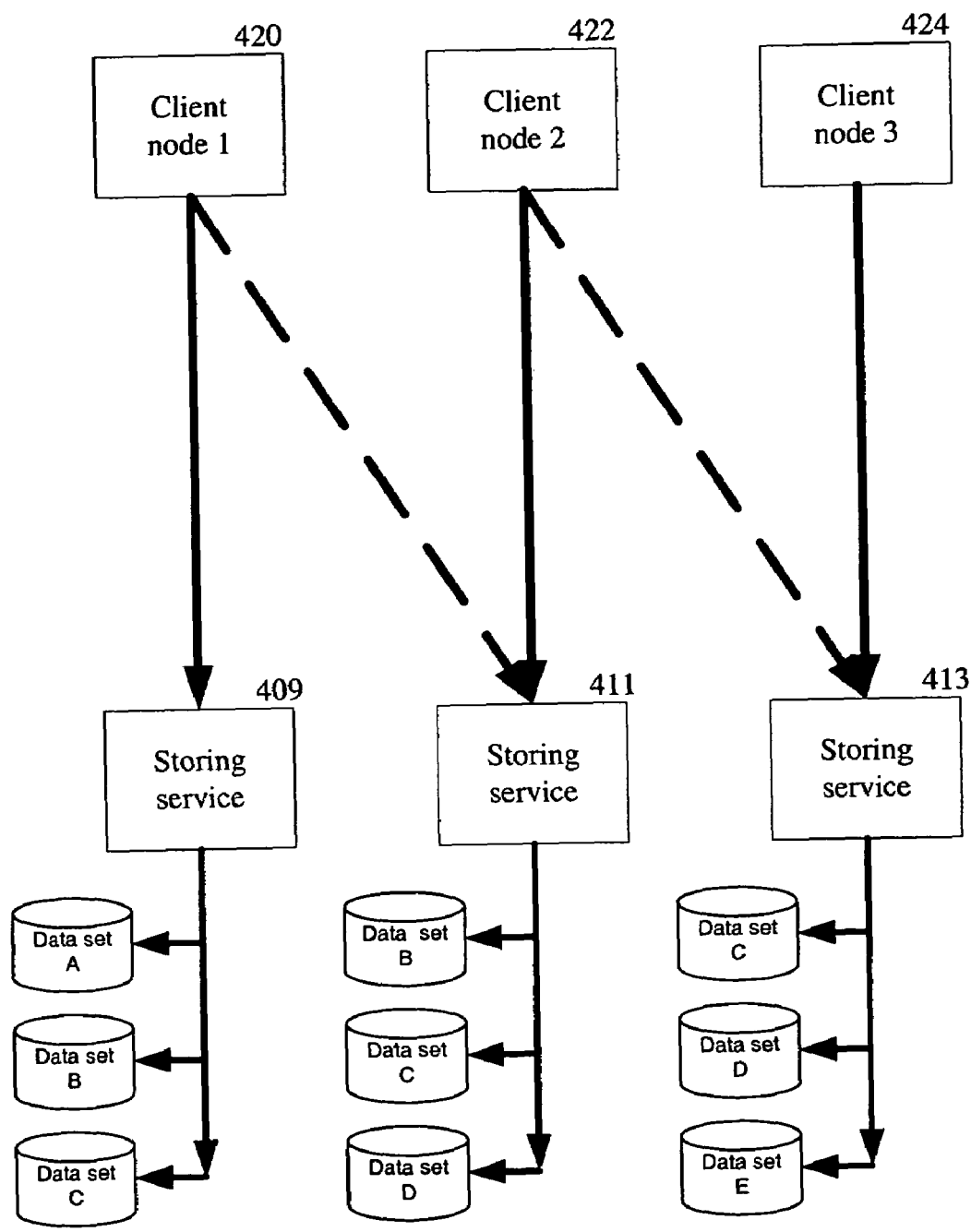

The flow of data through particular embodiments of the data management system are described now in conjunction with FIGS. 4A–D. FIGS. 4A–B illustrate data flows through the system when performing queries, with the storage nodes providing the filtering services and the compute nodes providing the aggregation services previously described. FIGS. 4C–D illustrate data flows through embodiments that upload data from clients onto the storage nodes in parallel, with the storage nodes providing the storage services and the compute nodes in FIG. 4C providing the parsing services previously described. A "meshed loading" embodiment shown in FIG. 4D directly interfaces the clients to the storage nodes and does not utilize a query master or compute nodes. The thickness of the arrows in FIGS. 4A–D represents typical changes in the amount of data in a data flow as it passes through the various stages of processing. Although the mass storage devices shown in FIGS. 4A–D are part of the storage nodes as previously described, they are illustrated separately for clarity in description.

Turning now to FIG. 4A, as previously described a query master 401 splits the processing of a query received from a client system 420 into multiple sub-queries, or partial query plans, which are run in parallel through every filtering service 409, 411, 413 by the aggregation services 403, 405, 407. The sub-queries are represented as "raw" SQL statements so that when the aggregation service on a compute node sends a command to the filtering service on a storage node, it actually sends a string representing the SQL command it wants the filtering service to run. Typically, such a statement might look like:

SELECT<columns needed, not the final targets!>
FROM<tablename>
WHERE<where clause>
GROUP BY<groupby clause>
HAVING<having clause>

The ORDER BY clause could be excluded if it is handled at the aggregation service. Compared to the traditional technique of representing the sub-queries as "parse trees" or "query plans," raw SQL allows the data management system of the present invention to inter-operate with traditional database managers.

When the sub-query contains a GROUP BY clause, each aggregation service 403, 405, 407 sends a request to each filtering service 409, 411, 413 requesting a given group, e.g. if the query specifies "GROUP BY country" then a given aggregation service might request the "USA" group to be returned to it. If each aggregation service requests multiple groups with disparate value ranges, the filtering service must create a working data set for each group from the column-file, requiring a significant amount of processing time and intermediate storage space. To minimize the load on the filtering services, in one embodiment, each aggregation service provides its "node number" to the filtering services with its request. The filtering service scans the requested column-file into memory and hashes the column values using the number of nodes and the requested values, which groups the requested values for each aggregation service into a single "hash bucket." The contents of the corresponding hash bucket for each aggregation service is returned to the aggregation service as a single result for all the requested groups.

Because there are N aggregation services, each filtering service will receive the same query N times with different predicates. Thus, by designing the filtering service to detect duplicate queries, it can run the query only once, dispersing the data to each node according to the hash-result on node number as previously described, to provide a form of multiple query optimization for the filtering services. Additionally, the filtering service can be designed to detect commonality among queries to develop more efficient partial query plans across several concurrent queries. For example, if query #1 is SELECT *
FROM table1
WHERE table1.country='usa'
GROUP BY table1.state
DURING 'noon today', '1 pm today' and query #2 is

SELECT *
FROM table1
WHERE table1.country='usa' and table1.amt_spent>100
GROUP BY substring(table1.zipcode, 0, 2) [i.e., first three digits of zip code]
DURING '11 am today', '1 pm today' the filtering service would detect that the table name is the same (table 1), the WHERE clauses share common sub-expressions, and that the time ranges overlap. Thus, after processing the WHERE clause for query #1 for all of the aggregation services, the filtering service would reuse the table1.country='usa' results for the noon-1 pm timeframe for query #2.

When data is replicated across storage devices as shown in FIG. 4A, an aggregation service will receive duplicate results from the parallel processing of a sub-query on all the filtering services. For example, aggregation service 403 will receive the same results for data set B 415 on filtering service 409 as from data set B 417 on filtering service 411. The aggregation service 403 should detect the duplicates and use only one of the data sets. In one embodiment, each duplicate data set is stored under a different name, such as nodeX.datasetname and nodeY.datasetname, and the aggregation service uses the name to determine duplicate results.

This replication and duplication detection adds failover capability to the system as shown in FIG. 4B. When aggregation service 403 issues a sub-query on data set B to the filtering services 409, 411 in parallel, and data set B 415 normally accessed by filtering service 409 is unavailable, the aggregation service 403 will receive results for data set B 417 only from filtering service 411. Because the aggregation service 403 is aware that data set B is mirrored, it can mark data set B 415 as unavailable and issue subsequent commands for data set B only to filtering service 411 until it receives notification that data set B 415 is again available. It will be appreciated that the filtering service 409 could detect a failure in data set B 415 and pro-actively inform the aggregation services 403, 405, 407 that data set B 415 is unavailable so that the aggregation services would not have to detect the failure themselves.

In FIG. 4C, the query master 401 handles data upload requests from client nodes 420, 422, 424 and creates a set of SQL statements that instruct the parsing services 403, 405, 407 on how to handle the data. The query master 401 sends the set of SQL statements to the parsing services 403, 405, 407, followed by the incoming data from the clients 420, 422, 424. The parsing services use the SQL statements to determine how to parse the data among the storage services 409, 411, 413 For example, on a Unix system, the normal designation of an input stream is "stdin" so a virtual table "stdin" is defined. The following SQL statement is sent to a parsing service and then the stream of data to be stored is sent:

INSERT INTO<tablename>
SELECT<col1, coln>
FROM stdin (parse instructions)
WHERE<where clause>
GROUP BY<groupby clause>
ORDER BY<orderby clause>
. . . raw data stream in text and/or binary formats . . .

The data stream may be mixed data format since the parse instructions explain how to divide up the stream.

Specifying the virtual table in a FROM clause also allows client queries on the incoming data stream without first storing the data. When the query contains a GROUP/ORDER BY clause, the query master creates a query plan, distributes the sub-queries to the aggregation services on the compute nodes, formats the incoming data stream to look like a data stream from a storage services, and sends it to the aggregation services for processing. In one embodiment, the SQL stdin statement handles multiple input streams to enable standard SQL multiple table processing, such as JOINs, UNIONs, etc.

In a related embodiment, the range for the primary key in the query can be open ended or the end-range omitted. In the latter case, referred to as "continuous query processing," the data management system assumes that the client wants to see all the data as it is stored in queryable form. When the primary key is chronological, the results of the query always moves forward in time. Therefore, once a time group is processed, the group is never revisited and the continuous query processing session can give partial results as each time group becomes queryable. A cancel command for the query is used to terminate the continuous query processing session.

In one embodiment, the query master 401 can act as a buffering proxy if it has access to a storage device. The query master 401 accepts uploaded input data from clients 420, 422, 424, and temporarily stores it on the storage device. The query master 401 informs the data source of the success of the store but only later transfers the data to the parsing services 403, 405, 407 for permanent storage by the storage services 409, 411, 413. In one embodiment, an asynchronous uploader executes on the machine hosting the query master 401 to receive the data and periodically transfer it onwards so that the temporary storage services is not overrun with the buffered data. The uploader may execute as a separate process or as a thread within another process, such as the query master 401. In another embodiment, a large buffering file is pre-allocated on a storage device to hold the buffered data, with the file system set to warn when the free space in the buffering file falls below a threshold value. If the buffering file becomes full, the uploader can be configured to choose a policy for discarding data (e.g. discard oldest data, discard newest data, discard random data, etc.), unlike traditional systems that only discard the newest data as it arrives. The asynchronous upload may be used in conjunction with the pre-allocated buffering file to provide even further protection for data integrity.

In another embodiment, the storage services 409, 411, 413 store the incoming data in three tiers before it is processed by the parsing services 403, 405, 407. A first tier storage service buffers the data when it is first received by the query master 401. The first tier storage service periodically sends the data to a designated second tier storage service, where it is buffered before being sent onto a third tier storage service that serves as input to the parsing services. Thus, as storage managed by a first tier storage service becomes full, the data can be sent to the appropriate second tier storage service. This embodiment is particularly useful to prevent the loss of data when the storage node running the third tier storage service is off-line or unreachable. Moreover, by designating the neighbor storage services for a first tier storage service as its second tier storage services, the uploaded data can be transferred using the same protocols used in replicating data as previously described. It will be appreciated that additional buffering tiers may be added without departing from the scope of the invention.

Multiple inputs can be merged together at the buffering tiers before being sent to the parsing services for processing, thus reducing the amount of processing necessary to merge the data after it has been stored in the column-files. However, the longer the data remains in the buffering tiers, the longer the latency in knowing what data is present and the longer the delay before it can be queried. In an alternate embodiment, the data is formatted into column-files before it is buffered on a tier so that the data can be queried before it is transferred to its permanent storage service.

Furthermore, as illustrated in FIG. 4D, when SQL statements are used to instruct the storage services on storing of incoming data, the client nodes 420, 422, 424 can format the SQL statements and directly transfer the SQL statements and the data to the storage services 409, 411, 413, thus functioning as the parsing services 403, 405, 407 and further eliminating a potential bottleneck at the query master 401. In the embodiment shown in FIG. 4D, each client node sends the data to a specific storage service as illustrated by the solid arrows. Each client node also replicates the data to another storage service as illustrated by the broken arrows. In an alternate embodiment, each storage service is responsible for replicating the data from the client node to another storage service. When each client node is uploading tables ordered on a strictly increasing primary key, such as time-ordered log data, the meshed loading illustrated in FIG. 4D also avoids the overhead of merging incoming data from multiple clients to preserve the data file clustering on the primary key. Additionally, the meshed loading embodiment of FIG. 4D is readily scalable to accommodate any number of simultaneously uploads.

METHODS OF EMBODIMENTS OF THE INVENTION

Figure 5A:
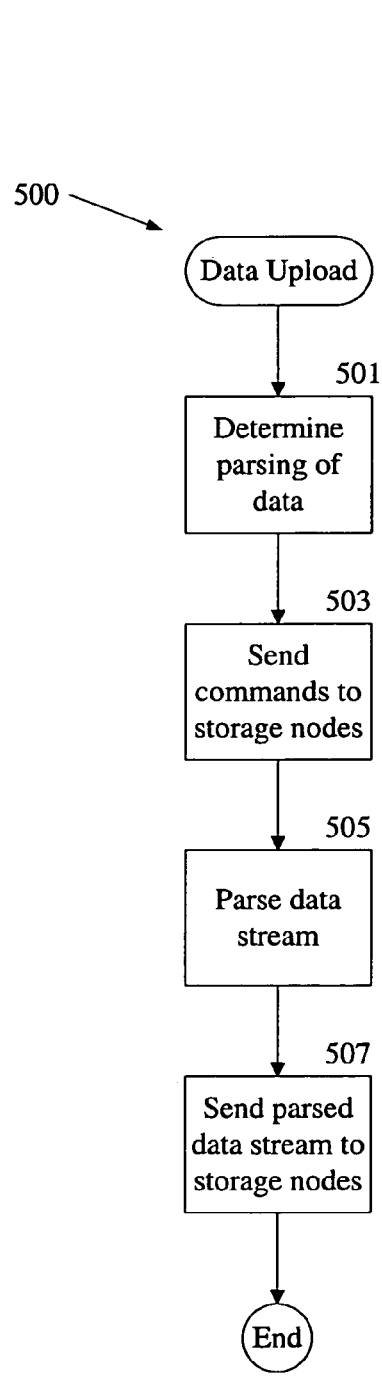
FIGS. 5A–B are flowcharts of methods to be performed when uploading data according to an embodiment of the invention.
Figure 5B:
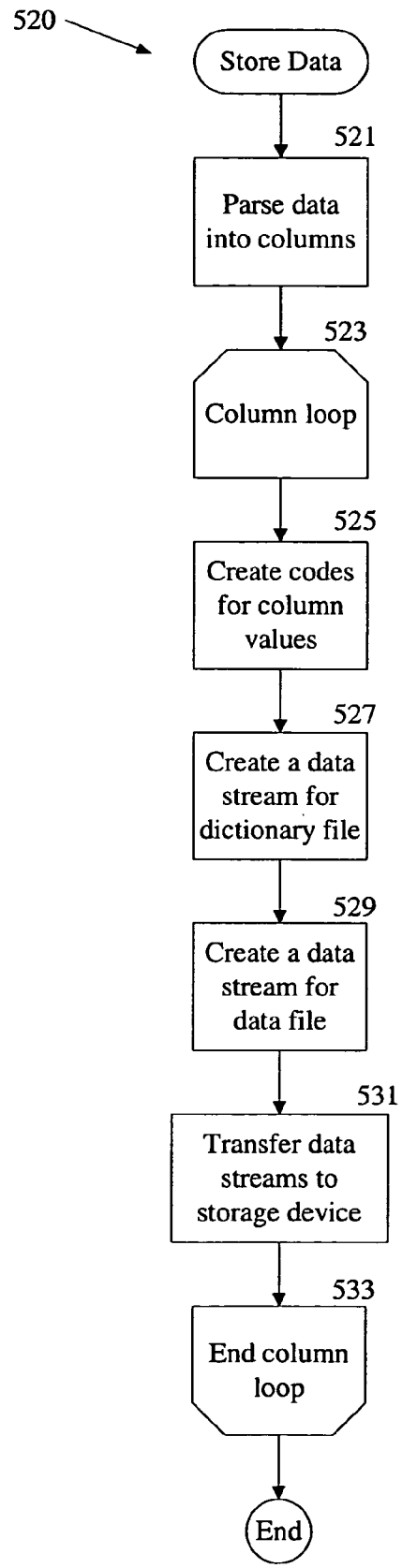
Figure 6:
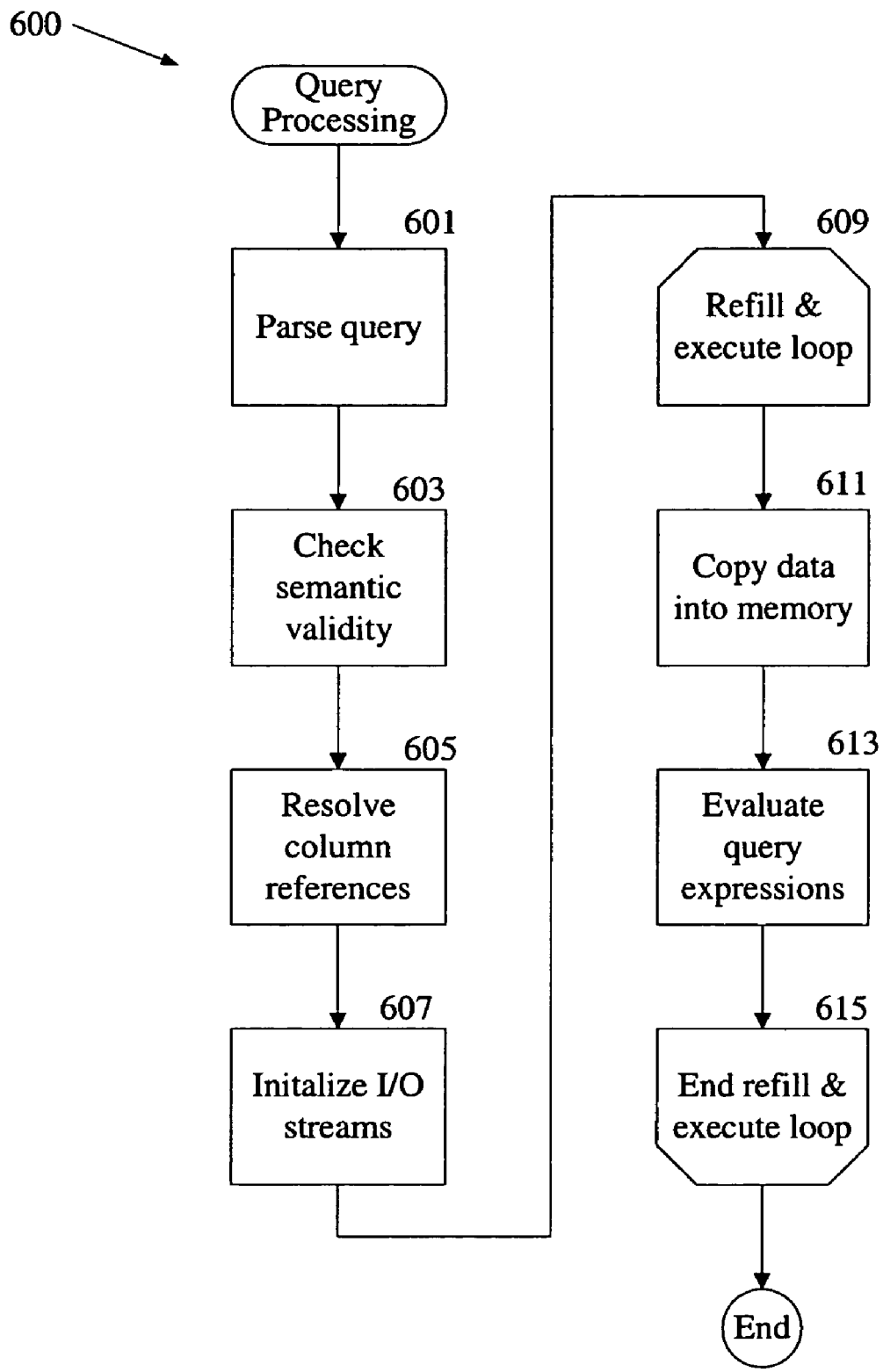
FIG. 6 is a flowchart of a method to be performed when processing a query according to an embodiment of the invention.
Figure 7:
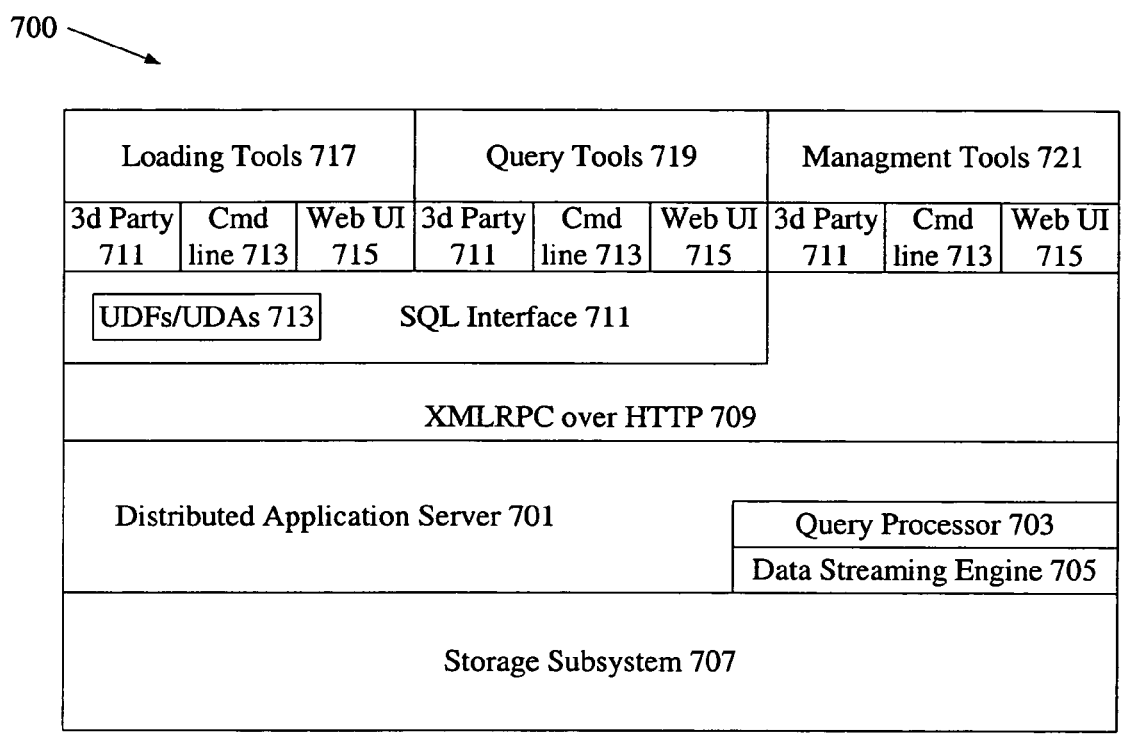
FIG. 7 is a diagram of one embodiment of a software architecture incorporating the methods illustrated in FIGS. 5A–B and 6.

The particular methods of the invention are now described in terms of computer software with reference to a series of flowcharts illustrated in FIGS. 5A–B and 6, and a particular embodiment of a software architecture illustrated in FIG. 7. The methods to be performed by a computer constitute computer programs made up of computer-executable instructions illustrated as blocks (acts). Describing the methods by reference to flowcharts enables one skilled in the art to develop such programs including such instructions to carry out the methods on suitably configured computers (the processing unit of the computer executing the instructions from computer-readable media) acting as a compute node or a storage node in accordance with the invention. The computer-executable instructions may be written in a computer programming language or may be embodied in firmware logic. If written in a programming language conforming to a recognized standard, such instructions can be executed on a variety of hardware platforms and for interface to a variety of operating systems, or incorporated into other programs such as network software. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Referring first to FIGS. 5A–B, the acts to be performed by computers when uploading data are described. FIG. 5A illustrates, in general, the processing performed by a compute node to provide parsing services. FIG. 5B, illustrates, in general, the processing performed by a storage node to provide storage services.

When a compute node receives an upload SQL command from a query master, a data upload method 500 shown in FIG. 5A is invoked Using the predicates in the command, the method 500 determines how to distribute the data among the storage nodes (block 501) and sends upload commands to the storage nodes (block 503). As the data stream is received from the query master, the method 500 parses the data stream according to its distribution scheme (block 505) and sends the parsed data stream to the storage nodes (block 507).

When a storage node receives an upload command from a compute node, a storage data method 520 shown in FIG. 5B is invoked. The method 520 determines the columns and column values to be stored and parses the data into its columns as it is received (block 521). The data values for each column are formatted and stored on a storage device using a series of processes starting at block 523 and ending at block 533. The method 520 creates codes for the column values based on the number of occurrences of a value (block 525), creates a data stream for the dictionary file from the column values and counts (block 527), and a data stream for the data file containing the codes in place of the corresponding column values (block 529). The method 520 transfers the data streams to the storage device for the storage node with instructions on writing the data stream, such as placing the dictionary file within the header for the data file (block 531). When each of the columns has been processed, the method 520 terminates. It will be appreciated that when the column values are horizontally partitioned into separate data files on primary key ranges, the processing defined by the column loop 523 through 533 will be performed on the column as partitioned.

When the codes created for the data file are derived from the number of occurrences of data values, in one embodiment, the data for a column is buffered until it is all received and the processing represented by the column loop 523–533 is performed on the buffered data. In an alternate embodiment, the column loop 523–533 is performed on batches of incoming data, requiring the unpacking & re-encoding of existing dictionary and data files when necessary to merge the new data into the existing files.

It will be appreciated that a method very similar to that illustrated in FIG. 5A would be performed by the client node when mesh loading data as previously described. Furthermore, one of skill in the art will readily understand how to modify the methods of FIG. 5A–B to accommodate proxy buffering and tiered storing based on those previous descriptions.

Turning now to FIG. 6, the acts to be performed by computers when processing a query are shown. Upon receipt of a SQL query or sub-query at a query master, compute or storage node, the query processing method 600 illustrated in FIG. 6 is invoked. The method 600 parses the query into a tree of expressions representing the semantics of the query (block 601) and performs preliminary checks to ensure the query is semantically valid (block 603). All references to columns are resolved (block 605) and a series of corresponding column I/O streams are initialized, one per column (block 607). The processing represented by block 607 initializes different types of I/O streams based on the type of node executing the method 600. For instance, the column I/O streams used by a storage node obtain the data from the column-files stored on that node, while the column I/O streams used by the query master and compute nodes obtain the data from other compute and storage nodes through the network as previously described. When the method 600 is executed by the lowest level compute nodes and the requested data is fully or partially mirrored, the processing represented by block 607 determines whether to initialize I/O streams to obtain data from all the mirroring storage nodes in parallel or from only a subset of the mirroring storage nodes.

The method 600 performs a refill and execute loop on each of the column I/O stream starting at block 609 and ending at block 615. The method 600 copies the data from the column I/O streams into memory buffers at block 611 ("refill"). When the method 600 is executing on a storage node, each column I/O stream contains the data file (and dictionary file if stored separately). The refill processing represented by block 611 also eliminates duplicate I/O streams when necessary. At block 613, the conditional expressions in the query are evaluated by performing the specified computation against the dictionary files ("execute"). To conserve bandwidth in transferring the data in the column I/O streams, the data files are only decompressed when required by the execute processing at block 613.

The particular methods performed by computers acting as the nodes in one embodiment of the invention have been described. The methods performed by computers when uploading data have been shown by reference to flowcharts in FIGS. 5A–B including all the acts from 501 until 507 and from 521 until 533. The method performed by computer when processing a query have been shown by reference to a flowchart in FIGS. 6 including all the acts from 601 until 615. It will be appreciated that more or fewer processes may be incorporated into the methods illustrated in FIGS. 5A–B and 6 without departing from the scope of the invention and that no particular order is implied by the arrangement of blocks shown and described herein.

The processes described for the methods in FIGS. 5A–B and 6 may be implemented on a node within a layered software architecture 700 as illustrated in FIG. 7. A distributed application server 701 handles queries for the storage and retrieval of data using a query processor 703. The query processor 703 interfaces with a storage subsystem 707 through a data streaming engine 705 that sends and receives the data specified in the query as described above. The data formatting, compression and indexing processes described above are handled in the storage subsystem 707. The distributed application server 701 may receive queries through its local SQL interface 711 or from other nodes through a network layer 709 using XMLRPC (Extensible Markup Language Remote Procedure Call) over HTTP (Hypertext Transport Protocol). As shown, the SQL interface 711 provides a "hook" for UDFs and UDAs 713. User-accessible loading tools 717 and query tools 719 access the SQL interface 711 through existing third-party applications 711, command line statements 713 and/or a World Wide Web user interface 715, such as a browser. Management tools 721 are also provided to manage remote nodes through the network layer 709. It will be appreciated that the architecture 700 is an exemplary embodiment and does not limit the processes of the invention to any one particular arrangement.

Operating Environment

Figure 8A:
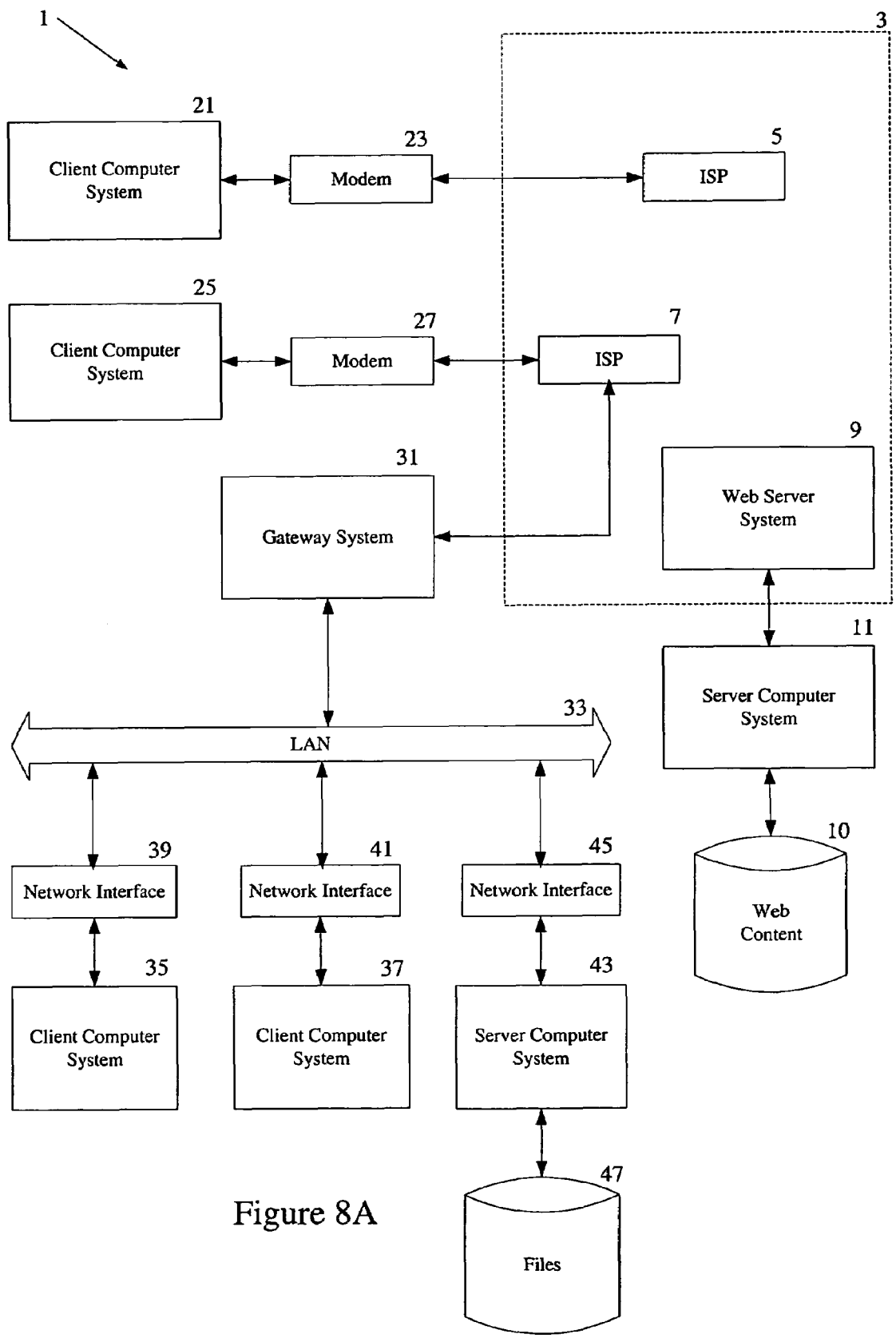
FIG. 8A is a diagram of one embodiment of an operating environment suitable for practicing the present invention.
Figure 8B:
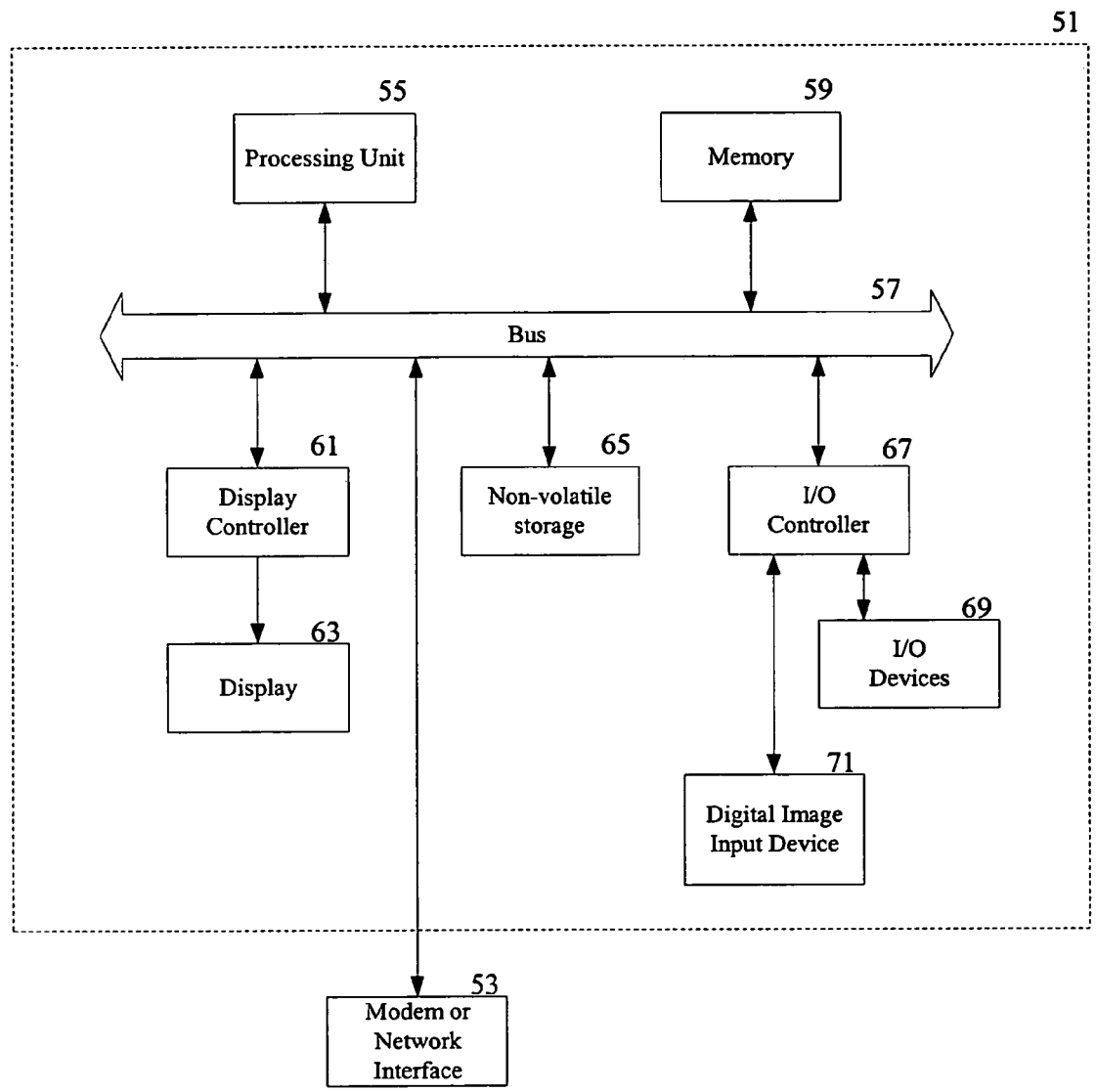
FIG. 8B is a diagram of one embodiment of a computer system suitable for use in the operating environment of FIG. 8A.

The following description of FIGS. 8A–B is intended to provide an overview of computer hardware and other operating components suitable for performing the methods of the invention described above, but is not intended to limit the applicable environments. One of ski in the art will immediately appreciate that the invention can be practiced with other computer system configurations, including hand-held devices, multiprocessor systems, microprocessor-based or programmable consumer electronics, network PCs, minicomputers, mainframe computers, and the like, or embedded into "network appliances." The invention can also be practiced in distributed computing environments where tasks are performed by remote processing devices that are linked through a communications network, such as content delivery networks.

FIG. 8A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 8A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 8A, the connections are not the same for these three computer systems. Client computer system 25 is coupled through a modem interface 27 while client computer systems 35 and 37 are part of a LAN. While FIG. 8A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 8B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 8B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

CONCLUSION

A data management system has been described that stores table data as continuous strips of column values and leverages this vertical partitioning through distributed query processing. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that no particular network protocol is required to connect the compute and storage nodes together. Additionally, those of ordinary skill within the art will appreciate any type of non-ephemeral storage device can be used to hold the column-files and a combination of such devices is contemplated as within the scope of the invention. Those of ordinary skill within the art further will appreciate that the designations "compute node" and "storage node" represent the roles played by computers within a network and the embodiments illustrated herein imply no inherent ratio of compute to storage nodes within the network.

While a single computer can host multiple instances of compute and/or storage nodes, in general, co-locating two instances of the same type of node is rarely of benefit except when the instances are different versions, such as when performing an upgrade. Co-locating different node types saves on hardware costs but at the expense of performance since compute nodes and storage nodes require different amounts of computer resources, and even compute nodes have different requirements based on their role in the system. A compute node acting as a query master is compute intensive (requiring a lot of processor cycles) and requires a large amount of network I/O bandwidth, but not much RAM, disk I/O bandwidth or disk capacity, so dedicating one or more compute nodes with fast processors as query masters can increase the efficiency of the system. A compute node acting as an aggregation node for a query is compute intensive and requires a lot of RAM and inbound network bandwidth, while requiring little disk capacity and disk I/O bandwidth only for large sorts. Outbound network bandwidth for an aggregation node varies with the aggregations but generally will be much less than incoming. Compute nodes acting as parse nodes for loading data serve as routers, parsing incoming data and distributing it to the storage nodes. They are compute intensive and require high network I/O bandwidth, but not much RAM, disk I/O bandwidth or capacity. Storage nodes require a lot of processor cycles in processing WHERE clauses, compressing and decompressing data, and need high network and disk I/O bandwidth to move the data into and out of storage and a large amount of disk capacity, but do not require much RAM.

Therefore, it is manifestly intended that this invention be limited only by the following claims and equivalents thereof.

What is claimed is:

1. A computerized method of storing table data comprising:
   parsing the table data into columns of values, each column represented as a continuous strip of data in a temporary storage;
   formatting each column into a data stream for permanent storage by linearly concatenating multiple columns into a single data stream; and
   directing a storage device to store each data stream as a continuous strip of compressed data without regard to a page size for the storage device.

2. The computerized method of claim 1 further comprising:
   partitioning each column into groups of values based on a primary key for the table data; and
   formatting each group of values into a data stream.

3. The computerized method of claim 1, wherein formatting each column comprises:
   compressing the values in the column.

4. The computerized method of claim 3, wherein compressing the values comprises:
   creating a code for each value in the column; and
   replacing each value with the corresponding code.

5. The computerized method of claim 4, wherein creating a code for each value comprises:
   creating a plurality of entries, one entry for each value in the column; and
   deriving the code from a location for the corresponding entry within the plurality of entries.

6. The computerized method of claim 4, wherein creating a code for each value comprises:
   determining a number of occurrences of each value in the column; and
   deriving the code for each value from the corresponding number of occurrences.

7. The computerized method of claim 4, wherein creating a code for each value comprises:
   creating a plurality of entries, one entry for each value in the column;
   storing a number of occurrences of each value in the column in the corresponding entry; and
   deriving the code for each value from the corresponding number of occurrences.

8. The computerized method of claim 7 further comprising:
   directing the storage device to store the plurality of entries in conjunction with the corresponding continuous strip of data.

9. The computerized method of claim 7 further comprising:
   directing the storage device to store the plurality of entries in a header for the corresponding continuous strip of data.

10. The computerized method of claim 4, wherein compressing the values further comprises:
    encoding the codes in the column according to an encoding table.

11. The computerized method of claim 1, wherein linearly concatenating comprises linearly concatenating a series of rows, each row comprising one value from each of the multiple columns.

12. A computer-readable medium having executable instructions to cause a computer to execute a method comprising:
parsing table data into columns of values, each column represented as a continuous strip of data in a temporary storage;
formatting each column into a data stream for permanent storage by linearly concatenating multiple columns into a single data stream; and
transferring each data stream to a storage device for storage as a continuous strip of compressed data without regard to a page size for the storage device.

13. The computer-readable medium of claim 12, wherein the method further comprises:
partitioning each column into groups of values based on a primary key for the table data; and
formatting each group of values into a data stream.

14. The computer-readable medium of claim 12, wherein the method further comprises compressing the values in a column when formatting the column.

15. The computer-readable medium of claim 14, wherein the method further comprises:
creating a code for each value in the column; and
replacing each value with the corresponding code when compressing the values in the column.

16. The computer-readable medium of claim 15, wherein the method further comprises:
creating a plurality of entries, one entry for each value in the column; and
deriving the code from a location for the corresponding entry within the plurality of entries.

17. The computer-readable medium of claim 15, wherein the method further comprises:
determining a number of occurrences of each value in the column; and
deriving the code for each value from the corresponding number of occurrences.

18. The computer-readable medium of claim 15, wherein the method further comprises:
creating a plurality of entries, one entry for each value in the column;
storing a number of occurrences of each value in the column in the corresponding entry; and
deriving the code for each value from the corresponding number of occurrences.

19. The computer-readable medium of claim 18, wherein the method further comprises:
directing the storage device to store the plurality of entries in conjunction with the corresponding continuous strip of data.

20. The computer-readable medium of claim 18, wherein the method further comprises:
directing the storage device to store the plurality of entries in a header for the corresponding continuous strip of data.

21. The computer-readable medium of claim 15, wherein the method further comprises:
encoding the codes in the column according to an encoding table.

22. The computer-readable medium of claim 12, wherein the method further comprises linearly concatenating a series of rows, each row comprising one value from each of the multiple columns, to linearly concatenating the multiple columns.

23. A computer system comprising:
a processing unit;
a memory coupled to the processing unit through a bus;
a storage device coupled to the processing unit through a bus; and
a data storing process executed from the memory by the processing unit to cause the processing unit to parse table data into columns of values with each column represented as a continuous strip of data in the memory, to format each column into a data stream for permanent storage by linearly concatenating multiple columns into a single data stream, and to direct the storage device to store the data stream as a continuous strip of compressed data without regard to a page size for the storage device.

24. The computer system of claim 23, wherein the data storing process further causes the processing unit to partition each column into groups of values based on a primary key for the table data and to format each group of values into a data stream.

25. The computer system of claim 23, wherein the data storing process further causes the processing unit to compress the values in a column when formatting the column.

26. The computer system of claim 25, wherein the data storing process further causes the processing unit to create a code for each value in the column and to replace each value with the corresponding code when compressing the values in the column.

27. The computer system of claim 26, wherein the data storing process further causes the processing unit to create a plurality of entries, one entry for each value in the column and to derive the code from a location for the corresponding entry within the plurality of entries.

28. The computer system of claim 26, wherein the data storing process further causes the processing unit to determine a number of occurrences of each value in the column and to derive the code for each value from the corresponding number of occurrences.

29. The computer system of claim 26, wherein the data storing process further causes the processing unit to create a plurality of entries, one entry for each value in the column, to store a number of occurrences of each value in the column in the corresponding entry, and to derive the code for each value from the corresponding number of occurrences.

30. The computer system of claim 29, wherein the data storing process further causes the processing unit to direct the storage device to store the plurality of entries in conjunction with the corresponding continuous strip of data.

31. The computer system of claim 29, wherein the data storing process further causes the processing unit to direct the storage device to store the plurality of entries in a header for the corresponding continuous strip of data.

32. The computer system of claim 26, wherein the data storing process further causes the processing unit to encode the codes in the column according to an encoding table when compressing the values in the column.

33. The computer system of claim 23, wherein the data storing process further causes the processing unit to linearly concatenate a series of rows, each row comprising one value from each of the multiple columns, to linearly concatenating the multiple columns.

34. A data storing system comprising:
a plurality of compute nodes coupled to a data source to receive table data from the data source and to parse the table data into columns of values, each column represented as a continuous strip of data in a temporary storage; and a plurality of storage nodes, each storage node comprising a storage device and coupled to the plurality of compute nodes to receive the columns of values from the compute nodes, to format each column into a data stream for permanent storage by linearly concatenating multiple columns into a single data stream, and to direct the storage device to store the data stream as a continuous strip of compressed data without regard to a page size for the storage device.

35. The data storing system of claim 34, wherein the plurality of compute nodes are further operable to partition each column into groups of values based on a primary key for the table data, and each storage node is further operable to format a group of values into a data stream.

36. The data storing system of claim 34, wherein each storage node is further operable to compress the values in a column when formatting the column.

37. The data storing system of claim 36, wherein each storage node is further operable create a code for each value in a column and to replace each value with the corresponding code when compressing the values in the column.

38. The data storing system of claim 37, wherein each storage node is further operable to encode the codes in the column according to an encoding table when compressing the values in the column.

39. The data storing system of claim 36, wherein each storage node is further operable to create a plurality of entries, one entry for each value in the column, to store a number of occurrences of each value in the column in the corresponding entry, and to derive the code for each value from the corresponding number of occurrences.

40. The data storing system of claim 39, wherein each storage node is further operable to direct the storage device to store the plurality of entries in conjunction with the corresponding continuous strip of data.

41. The data storing system of claim 39, wherein each storage node is further operable to direct the storage device to store the plurality of entries in a header for the corresponding continuous strip of data.

42. The data storing system of claim 34, wherein each storage node is further operable to linearly concatenate a series of rows, each row comprising one value from each of the multiple columns, to linearly concatenating the multiple columns.

43. The data storing system of claim 34, wherein one of the plurality of compute nodes acts as a master to receive the table data from the data source and to transfer the table data and instructions for storing the table data to the other compute nodes.

* * * * *